(12) United States Patent
Takenaka et al.

(10) Patent No.: US 9,489,500 B2
(45) Date of Patent: Nov. 8, 2016

(54) MANIPULATION APPARATUS

(71) Applicant: DENSO CORPORATION, Kariya, Aichi-pref. (JP)

(72) Inventors: Kenichi Takenaka, Anjo (JP); Kazunori Takemura, Toyota (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/414,966

(22) PCT Filed: Aug. 21, 2013

(86) PCT No.: PCT/JP2013/004951
§ 371 (c)(1),
(2) Date: Jan. 15, 2015

(87) PCT Pub. No.: WO2014/030352
PCT Pub. Date: Feb. 27, 2014

(65) Prior Publication Data
US 2015/0205943 A1 Jul. 23, 2015

(30) Foreign Application Priority Data

Aug. 23, 2012 (JP) ................................. 2012-184516
Aug. 19, 2013 (JP) ................................. 2013-169696

(51) Int. Cl.
*G06F 21/31* (2013.01)
*G06F 3/0488* (2013.01)
(Continued)

(52) U.S. Cl.
CPC ........... *G06F 21/31* (2013.01); *G01C 21/3664* (2013.01); *G06F 3/0488* (2013.01);
(Continued)

(58) Field of Classification Search
None
See application file for complete search history.

(56) References Cited

U.S. PATENT DOCUMENTS 6,034,672 A 3/2000 Gaultier et al.
2002/0140949 A1* 10/2002 Sasaki .............. G01N 21/95684
356/606

(Continued)

FOREIGN PATENT DOCUMENTS

JP 11-64026 A 3/1999
JP 2009-116583 A 5/2009
JP 2012-68884 A 4/2012

OTHER PUBLICATIONS

Office Action mailed Apr. 28, 2015 issued in corresponding JP patent application No. 2013-169696 (and English translation).

(Continued)

*Primary Examiner* — David Le
(74) *Attorney, Agent, or Firm* — Posz Law Group, PLC

(57) ABSTRACT

A remote manipulation apparatus includes a touch sensor and a manipulation control circuit to detect manipulation on a manipulation surface using a manipulator's finger. The touch sensor and the manipulation control circuit can acquire a manipulation entity distance between the manipulation surface and the finger. When the manipulation entity distance is shorter than a first threshold distance, the manipulation control circuit associates the finger manipulation with a pointer control to move a pointer on a display screen. When the distance exceeds the first threshold distance, the manipulation control circuit associates the finger manipulation with a map control to move a map on the display screen. The manipulation control circuit stores a specified finger manipulation as an authorization manipulation. The association between the finger manipulation and the map control is inhibited until the authorization manipulation using the finger is performed.

25 Claims, 27 Drawing Sheets

(51) Int. Cl.
   *G06F 3/0484* (2013.01)
   *G06F 3/0481* (2013.01)
   *G01C 21/36* (2006.01)

(52) U.S. Cl.
   CPC ....... *G06F 3/04812* (2013.01); *G06F 3/04842* (2013.01); *G06F 3/04845* (2013.01); *G06F 3/04847* (2013.01); *G06F 3/04883* (2013.01); *G06F 3/04886* (2013.01); *G06F 2203/04101* (2013.01)

(56) References Cited

U.S. PATENT DOCUMENTS

| | | | |
|---|---|---|---|
| 2006/0244733 A1* | 11/2006 | Geaghan | 345/173 |
| 2007/0257891 A1 | 11/2007 | Esenther et al. | |
| 2010/0134447 A1 | 6/2010 | Nakajoh | |
| 2011/0050629 A1 | 3/2011 | Homma et al. | |
| 2011/0128164 A1 | 6/2011 | Kang et al. | |
| 2012/0146945 A1 | 6/2012 | Miyazawa et al. | |
| 2012/0154305 A1 | 6/2012 | Nunomaki | |
| 2012/0299851 A1* | 11/2012 | Homma et al. | 345/173 |
| 2013/0321305 A1* | 12/2013 | Liang et al. | 345/173 |

OTHER PUBLICATIONS

International Search Report of the International Searching Authority mailed Oct. 8, 2013 for the corresponding International application No. PCT/JP2013/004951 (and English translation).

Written Opinion of the International Searching Authority mailed Oct. 8, 2013 for the corresponding International application No. PCT/JP2013/004951 (and English translation).

* cited by examiner

| | SENSITIVITY THRESHOLD (count) |
|---|---|
| Hth1U | 200 |
| Hth1D | 180 |
| Hth2U | 100 |
| Hth2D | 80 |

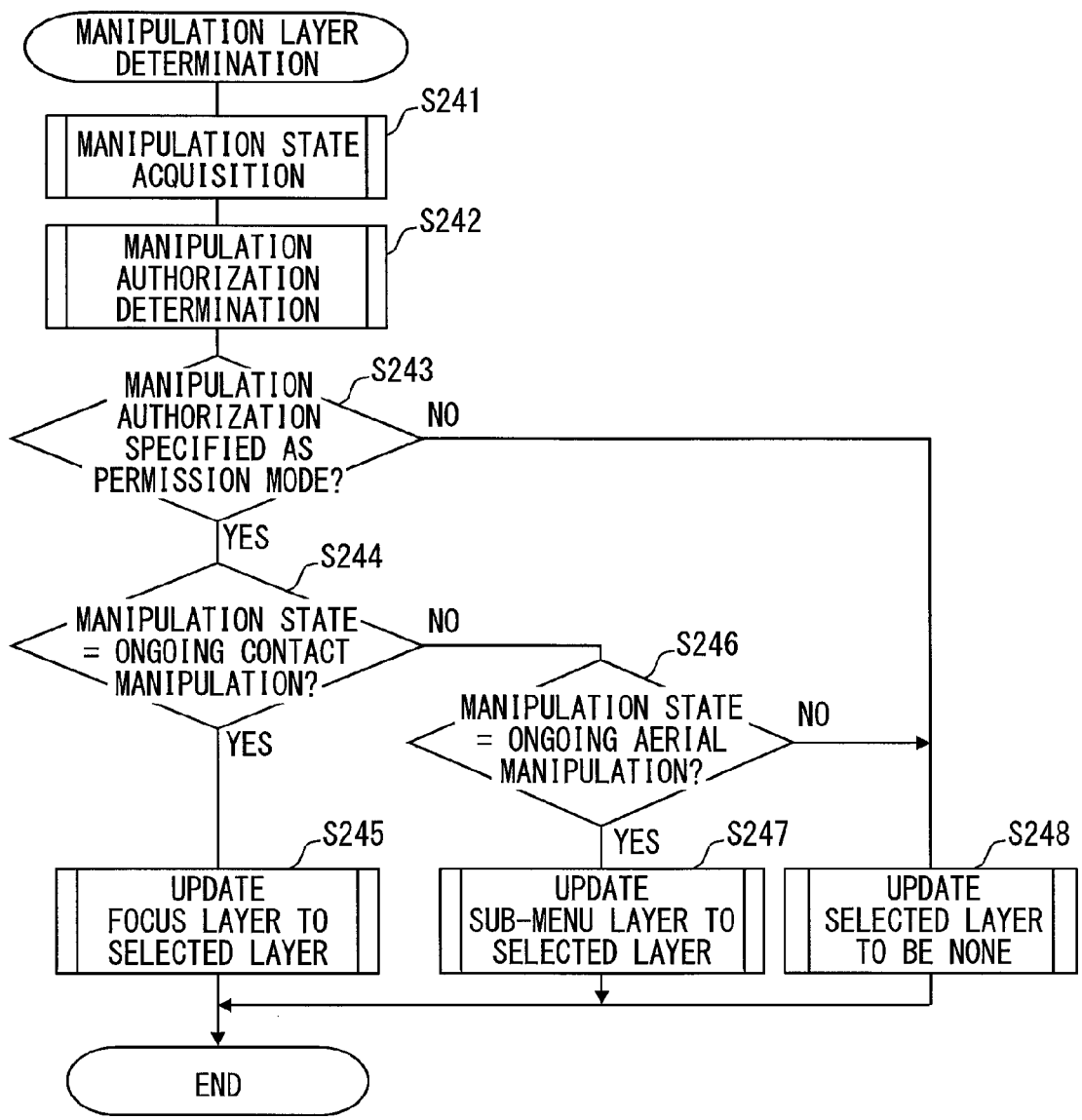

| | SENSITIVITY THRESHOLD (count) |
|---|---|
| Hth1 | 200 |
| Hth2 | 100 |

MANIPULATION APPARATUS

CROSS REFERENCE TO RELATED APPLICATION

The present disclosure is a U.S. national stage application of PCT/JP2013/004951 filed on Aug. 21, 2013 and is based on Japanese Patent Application No. 2012-184516 filed on Aug. 23, 2012 and Japanese Patent Application No. 2013-169696 filed on Aug. 19, 2013, the disclosures of which are incorporated herein by reference.

TECHNICAL FIELD

The present disclosure relates to a manipulation apparatus that manipulates an image portion displayed on a display portion by performing an input to a manipulation portion.

BACKGROUND ART

As a related art, for example, Patent Literature 1 discloses the technology that moves an image portion, such as a pointer for navigation or a main window image for radio, displayed on a display screen in association with a manipulation on a remote touchpad portion positioned distantly from the display screen. The user interface apparatus disclosed in Patent Literature 1 includes a remote touchpad portion and a control portion. The remote touchpad portion detects a manipulator's manipulation using his or her finger, for example. The control portion associates the finger movement detected by the remote touchpad portion with movement of a map and a pointer.

In addition, the control portion acquires a distance from the remote touchpad portion to the finger. Suppose a case where the acquired distance to the finger is less than a predetermined height such as three centimeters (cm), for example. In such a case, the control portion associates the finger manipulation detected by the remote touchpad portion with the manipulation to move the pointer on the display screen. In contrast, suppose a case where the distance to the finger acquired by the control portion satisfies a predetermined range of heights between 5 and 7 cm. In such a case, the control portion associates the finger manipulation detected by the remote touchpad portion with the manipulation to change the main window image for radio to a manipulation wait window image for radio.

According to the above-mentioned configuration, a manipulator can adjust the height of his or her finger with reference to the remote touchpad portion, select an intended image portion from the image portions such as the pointer for navigation and the main window image for radio, and manipulate the selected image portion.

PRIOR ART LITERATURES

Patent Literature

Patent Literature 1: JP 2011-118857 A

SUMMARY OF INVENTION

The inventors analyzed that the manipulation apparatus described in Patent Literature 1 needs to permit the finger to touch the touchpad portion in order to manipulate a pointer that belongs to a hierarchy lower than the main window image for radio. In this case, the finger may approach the touchpad portion before the finger duly reaches the touchpad. We found that the main window image for radio transitions to a different main window image for a different instrument against the manipulator's intention. Incorrectly changing the main window images thereby necessitates the manipulator's redoing a large part of input manipulation on the instrument. The inventors thus found a technical issue that leads to a great loss of apparatus manipulability.

It is an object of the present disclosure to provide a manipulation apparatus capable of allowing advanced manipulability for manipulation of an image portion displayed on a display screen.

To achieve the above object, according to a first aspect of the present disclosure, a manipulation apparatus is provided as including a manipulation portion that accepts input using a manipulation entity to manipulate an image portion displayed on a display portion. The manipulation apparatus includes: a detection section, an acquisition section, an association section, an authorization section, and a mode changeover section. The detection section detects a movement manipulation to move the manipulation entity along the manipulation portion. The acquisition section acquires a measurement value increasing and decreasing according to a manipulation entity distance between the manipulation portion and the manipulation entity. Based on the measurement value acquired by the acquisition section, the association section associates the movement manipulation detected by the detection section with a first image control to change a display mode of a first image portion as the image portion in response to the manipulation entity distance being shorter than a predetermined threshold distance while associating the movement manipulation detected by the detection section with a second image control to change a display mode of a second image portion as the image portion different from the first image portion in response to the manipulation entity distance exceeding the threshold distance. The authorization manipulation determination section previously stores a specific manipulation performed by the manipulation entity as an authorization manipulation and determines whether the authorization manipulation is performed. The mode changeover section switches between an inhibition mode and a permission mode. The inhibition mode inhibits the associating, by the association section, of the movement manipulation with the second image control. The permission mode permits the associating, by the association section, of the movement manipulation with the second image control. The mode changeover section changes the inhibition mode to the permission mode under a condition that the authorization manipulation determination section determines that the authorization manipulation is performed under the inhibition mode.

According to the above disclosure, a mode changeover section maintains an inhibition mode, which inhibits the association between (i) a movement manipulation using the manipulation entity and (ii) a second image control to change a display mode of a second image portion on the display portion, until a specified authorization manipulation using a manipulation entity is performed to the manipulation apparatus. This interrupts the association between the movement manipulation using the manipulation entity and the second image control. When attempting to manipulate a first image portion, a manipulator may move the manipulation entity to a manipulation portion as closely as being shorter than a threshold distance. In such a case, the movement is hardly associated with the second image control against the manipulator's intention.

When the authorization manipulation using the manipulation entity is performed to the manipulation apparatus, the mode changeover section changes the inhibition mode to the permission mode that permits association between the second image control and the movement manipulation using the manipulation entity. This starts the association between the movement manipulation using the manipulation entity and the second image control. The manipulator can thereby select one of the first image portion and the second image portion and change the display mode for the selected one while continuing the manipulation using the manipulation entity.

The above-mentioned configuration can avoid complicated manipulation to an intended image portion and reduce possibilities of inadvertently moving an image portion against the manipulator's intention. This achieves the manipulation apparatus excellent in manipulability concerning an image portion displayed on the display portion.

According to a second aspect of the present disclosure, a manipulation apparatus is provided as including a manipulation portion that accepts input using a manipulation entity to manipulate an image portion displayed on a display portion. The manipulation apparatus includes a detection section, an association section, a determination section, and a mode changeover section. The detection section detects a movement manipulation to move the manipulation entity along the manipulation portion and determines whether the movement manipulation corresponds to a contact manipulation or an aerial manipulation. The contact manipulation causes the manipulation entity to contact the manipulation portion; the aerial manipulation causes the manipulation entity to be distanced from the manipulation portion. The association section associates the contact manipulation and the aerial manipulation detected by the detection section with controls over the image portions different from each other. The determination section previously stores a specific manipulation performed by the manipulation entity as an authorization manipulation and determines whether the authorization manipulation is performed. The mode changeover section enables a permission mode when the determination section determines that the authorization manipulation is performed; the permission mode permits the associating of the aerial manipulation with the control over the image portion. The mode changeover section also enables an inhibition mode when the determination section determines that the authorization manipulation is not performed; the inhibition mode inhibits the associating of the aerial manipulation with the control over the image portion.

According to the above disclosure, the mode changeover section maintains the inhibition mode to inhibit acceptance of an aerial manipulation until a specific authorization manipulation using the manipulation entity is performed to the manipulation apparatus. To perform a contact manipulation, the manipulator may move the manipulation entity to a manipulation surface until a manipulation determination section identifies a contact manipulation. In such a case, this movement can be free from being accepted as an aerial manipulation against the manipulator's intention.

When the authorization manipulation using the manipulation entity is performed to the manipulation apparatus, the mode changeover section changes the inhibition mode to the permission mode that permits acceptance of the aerial manipulation. When the acceptance of the aerial manipulation using the manipulation entity starts, the manipulator can select one of an image portion associated with the contact manipulation and an image portion associated with the aerial manipulation and manipulate the selected one while continuing the manipulation using the manipulation entity.

The above-mentioned configuration can avoid complicated manipulation to an intended image portion and reduce possibilities of inadvertently moving an image portion against the manipulator's intention. This achieves the manipulation apparatus excellent in manipulability concerning an image portion displayed on the display screen.

According to a third aspect of the present disclosure, a manipulation apparatus is provided as follows. The manipulation apparatus causes a display control section controlling display of a display portion to acquire a signal based on input using a manipulation entity to a manipulation portion and enables a manipulation using the manipulation entity to an image portion displayed on the display portion. The manipulation apparatus includes a detection section, an image portion changeover section, an acquisition determination section, and an acquisition control section. The detection section detects a relative position of the manipulation entity in relation to the manipulation portion as an input position coordinate in a three-dimensional direction. The image portion changeover section causes the display control section to change the image portion to be controlled based on whether a value indicating a z-axis coordinate exceeds a predetermined threshold value; the z-axis coordinate is included in the input position coordinate detected by the detection section and corresponds to a distance between the manipulation portion and the manipulation entity. The acquisition determination section determines whether the display control section is permitted to acquire the signal indicating the input position coordinate in response to a change crossing over the threshold value resulting from a movement of the manipulation entity; the change is from a value indicating the z-axis coordinate corresponding to a point before the movement to a value indicating the z-axis coordinate corresponding to a point after the movement. The acquisition control section causes the display control section to interrupt acquiring the signal until a permission determination is performed by the acquisition determination section; the permission determination permits the display control section to acquire the signal. The acquisition control section permits the display control section to start acquiring the signal based on the permission determination having been performed.

According to a fourth aspect of the present disclosure, a manipulation apparatus is provided as follows. The manipulation apparatus causes a display control section controlling display of a display portion to acquire a signal based on input using a manipulation entity to a manipulation portion and enables a manipulation using the manipulation entity to an image portion displayed on the display portion. The manipulation apparatus includes a detection section, an image portion changeover section, an output determination section, and an output control section. The detection section detects a relative position of the manipulation entity in relation to the manipulation portion as an input position coordinate in a three-dimensional direction. The image portion changeover section causes the display control section to change the image portion to be controlled based on whether a value indicating a z-axis coordinate exceeds a predetermined threshold value; the z-axis coordinate is included in the input position coordinate detected by the detection section and corresponds to a distance between the manipulation portion and the manipulation entity. The output determination section determines whether to output the signal indicating the input position coordinate to the display control section in response to a change crossing over the threshold value resulting from a movement of the manipulation entity; the change is from a value indicating the z-axis coordinate corresponding to a point before the movement to a value indicating the z-axis coordinate corresponding to a point after the movement. The output control section interrupts outputting the signal to the display control section until a permission determination is performed by the output determination section; the permission determination permits outputting the signal to the display control section. The output control section permits starting of outputting the signal to the display control section based on the permission determination having been performed.

According to a fifth aspect of the present disclosure, a manipulation apparatus is provided as follows. The manipulation apparatus causes a display control section controlling display of a display portion to acquire a signal based on input using a manipulation entity to a manipulation portion and enables a manipulation using the manipulation entity to an image portion displayed on the display portion. The manipulation apparatus includes a detection section, an image changeover section, an activation determination section, and an activation control section. The detection section detects a relative position of the manipulation entity in relation to the manipulation portion as an input position coordinate in a three-dimensional direction. The image portion changeover section causes the display control section to change the image portion to be controlled based on whether a value indicating a z-axis coordinate exceeds a predetermined threshold value; the z-axis coordinate is included in the input position coordinate detected by the detection section and corresponds to a distance between the manipulation portion and the manipulation entity. The activation determination section determines whether the display control section is permitted to activate a control of the image portion based on the input position coordinate in response to a change crossing over the threshold value resulting from a movement of the manipulation entity; the change is from a value indicating the z-axis coordinate corresponding to a point before the movement to a value indicating the z-axis coordinate corresponding to a point after the movement. The activation control section causes the display control section to interrupt activating the control of the image portion until a permission determination is performed by the acquisition determination section; the permission determination permits the display control section to acquire the signal. The activation control section permits the display control section to start activating the control of the image portion based on the permission determination having been performed.

According to a sixth aspect of the present disclosure, a manipulation apparatus is provided as follows. The manipulation apparatus is connected to a display control section to draw a display image transmitted to a display portion and is capable of manipulating an image portion included in the display image in response to input to a manipulation portion using a manipulation entity. The manipulation apparatus includes a detection section, a transmission control section, and a drawing section. The detection section detects a contacting state and an approaching state of the manipulation entity in relation to the manipulation portion. The transmission control section causes the display control section to transmit the display image including a first image portion corresponding to the contacting state to the display portion according to the detection section detecting the contacting state; the transmission control section also causes the display control section to transmit the display image including a second image portion corresponding to the approaching state to the display portion according to the detection section detecting the approaching state. The drawing control section inhibits the display control section from drawing the second image portion into the display image when the manipulation entity detected by the detection section is under a state transition changing from the approaching state to the contacting state.

These disclosures can avoid a situation where the manipulation entity approaches the manipulation portion to inadvertently manipulate it. Specifically, the third aspect allows the display control section to interrupt signal acquisition until the permission is determined. Therefore, movement of allowing the manipulation entity to approach the manipulation portion does not manipulate the image portion.

The fourth aspect interrupts output of a signal to the display control section until the permission is determined. The fifth aspect allows the display control section to interrupt control over an image portion until the permission is determined. According to these aspects also, movement of allowing the manipulation entity to approach the manipulation portion does not manipulate the image portion.

The sixth aspect prevents the display control section from drawing a second image portion onto a display image when the manipulation entity is in the middle of state transition of moving from an approaching state to a contacting state. Temporarily inhibiting drawing of the second image portion can also avoid a situation where movement of allowing the manipulation entity to approach the manipulation portion manipulates the image portion.

According to a seventh aspect of the present disclosure, an inhibition mode, when specified, may inhibit input using the manipulation entity from changing the display mode for a second image regardless of the threshold distance.

Similarly to an eighth aspect of the present disclosure, it may be favorable to specify an inhibition mode that prevents input using the manipulation entity from being reflected on display mode for an image portion if a distance between the manipulation portion and the manipulation entity exceeds a threshold value. It may be favorable to specify a permission mode that reflects input using the manipulation entity on display mode for the image portion even if a distance between the manipulation portion and the manipulation entity exceeds a threshold value when the authorization manipulation is performed.

Similarly to a ninth aspect of the present disclosure, there may be provided a control circuit that changes a first mode to a second mode based on manipulation using the manipulation entity. The first mode maintains the display mode for an image portion unchanged regardless of whether or not the distance between the manipulation portion and the manipulation entity exceeds a specified distance. The second mode changes the display mode for an image portion depending on whether or not the distance between the manipulation portion and the manipulation entity exceeds a specified distance.

BRIEF DESCRIPTION OF DRAWINGS

The above and other objects, features and advantages of the present disclosure will become more apparent from the following detailed description made with reference to the accompanying drawings. In the drawings:

FIG. 17 illustrates sensitivity threshold values stored in the manipulation control circuit according to the second embodiment while a vehicle is stopped or is traveling;

FIG. 18 is a flowchart illustrating a manipulation layer determination process performed by the manipulation control circuit according to the second embodiment;

EMBODIMENTS FOR CARRYING OUT INVENTION

Figure 1:
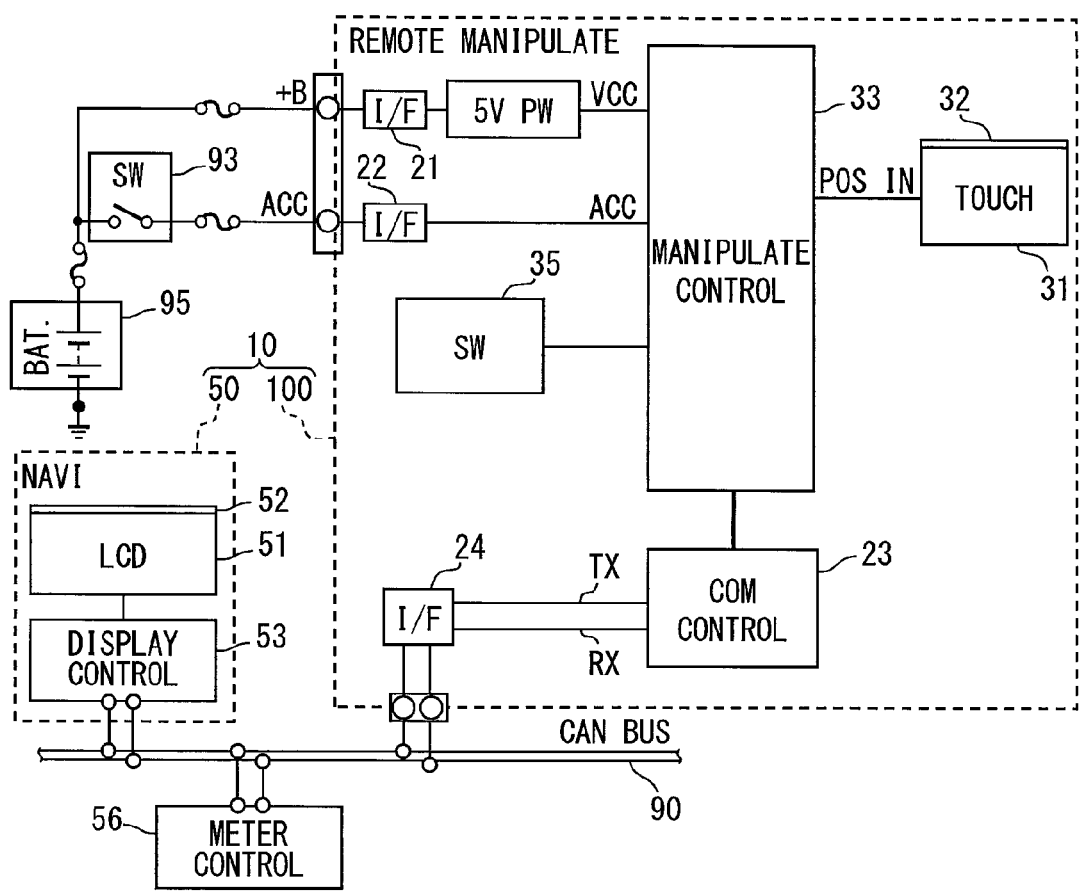
FIG. 1 illustrates a configuration of a display system including a remote manipulation apparatus according to a first embodiment of the present disclosure.

Embodiments of the present disclosure will be described in further detail with reference to the accompanying drawings. The same reference numerals may be used for the mutually corresponding elements in the embodiments to omit a duplicate description. A subsequent embodiment may describe only part of the configuration. In such a case, the other part of the configuration is applicable to the corresponding part of the configuration described in the preceding embodiment. Combinations of the configurations are not limited to those explicitly described in the embodiments. The configurations of the embodiments may be partially combined, even if not explicitly described, except an invalid combination.

(First Embodiment)

Figure 5:
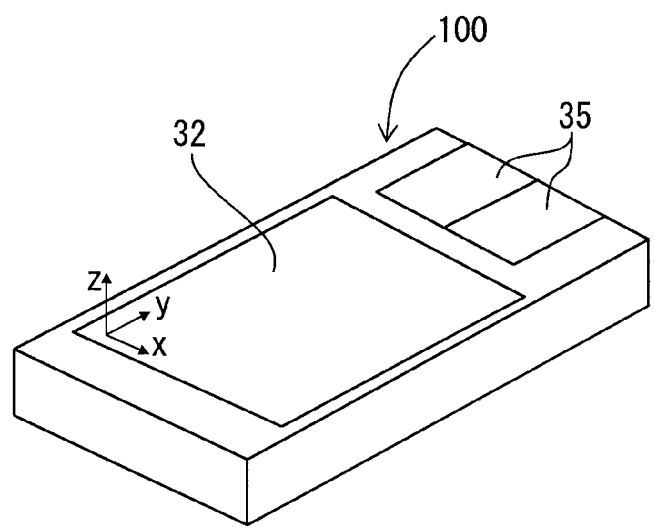
FIG. 5 is a perspective view illustrating the remote manipulation apparatus.

As illustrated in FIG. 1, a remote manipulation apparatus 100 according to a first embodiment of the present disclosure is mounted in a vehicle and included, together with a navigation apparatus 50, in a display system 10. As illustrated in FIG. 1, the remote manipulation apparatus 100 includes a touch sensor 31. As illustrated in FIG. 5, the surface of the touch sensor 31 is defined as a touch surface 32 manipulated by a manipulator using a finger of his or her hand (hereinafter referred to as a finger). A push switch 35 is placed adjacent to the touch surface 32.

Figure 2:
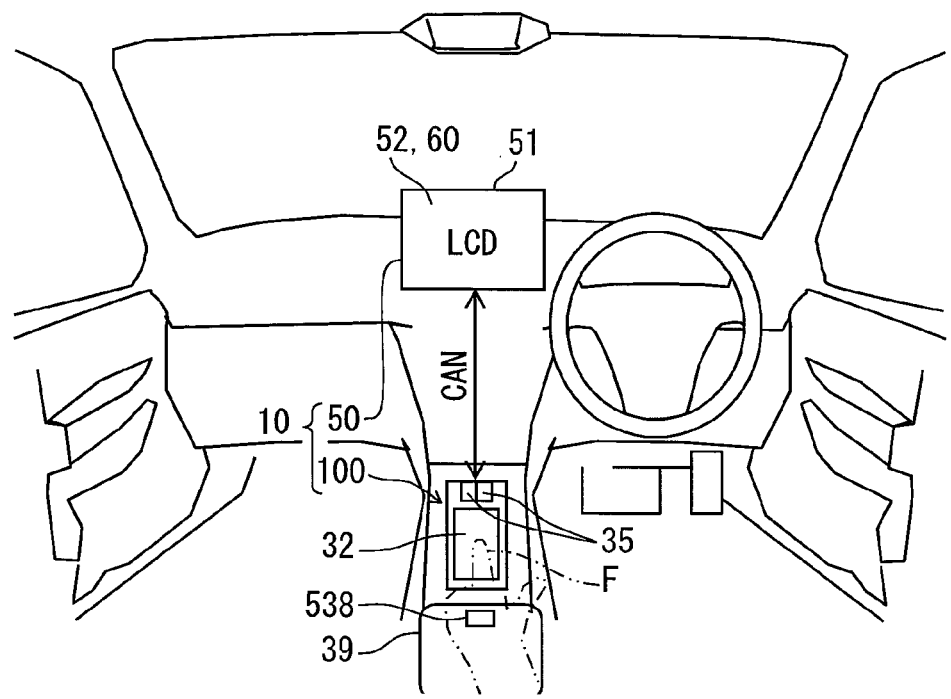
FIG. 2 illustrates placement of a display screen and a manipulation surface in a vehicle compartment.

As illustrated in FIG. 2, the remote manipulation apparatus 100 is provided adjacent to a palm rest 39 at a vehicle's center console. The remote manipulation apparatus 100 includes a manipulation surface 32 that is exposed within the manipulator's reach. The navigation apparatus 50 is provided in a vehicle's instrument panel so that a display screen 52 is exposed to be visible from the manipulator and is oriented to a driver's seat. The display system 10 allows the display screen 52 to display various display images 60 so that they change as needed.

Figure 3:
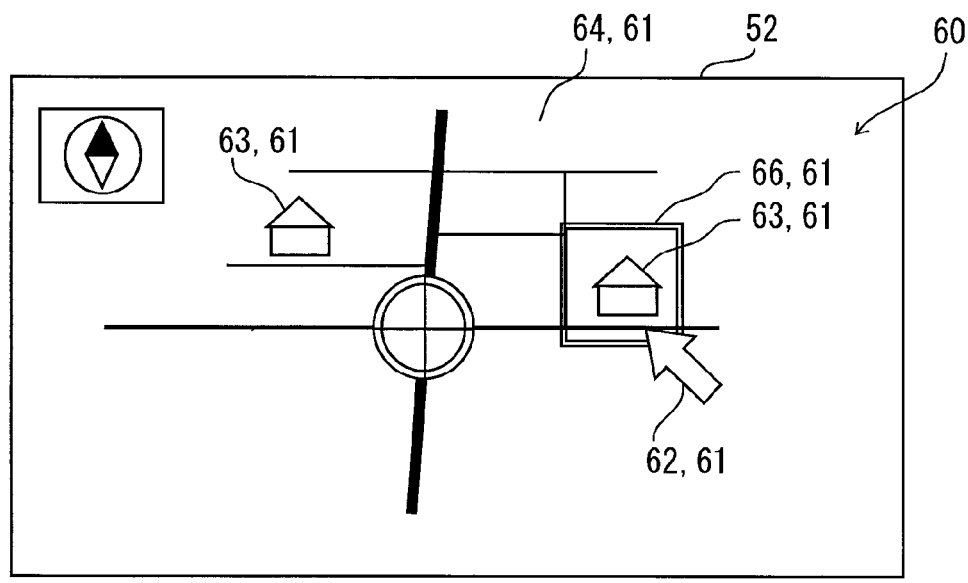
FIG. 3 illustrates a display image displayed on a display screen.

A display image 60 illustrated in FIG. 3 is one of display images displayed on the display screen 52 and represents a navigation image that indicates a route to a destination specified by the manipulator. The display image 60 contains a plurality of image portions 61 such as a plurality of icons 63, a pointer 62, and a map 64. The icon 63 is associated with a predetermined function. The pointer 62 selects the icon 63. The map 64 represents the shape of a road around the vehicle. The display image 60 also contains a focus 66 that highlights the icon 63 overlapped with the pointer 62. A position to display the pointer 62 and the focus 66 on the display screen 52 corresponds to the current position of the manipulator's finger manipulating on the manipulation surface 32. The display of the pointer 62 may be omitted; the pointer 62 may be replaced by the focus 66 instead to correspond to the position of the manipulator's finger.

Figure 4:
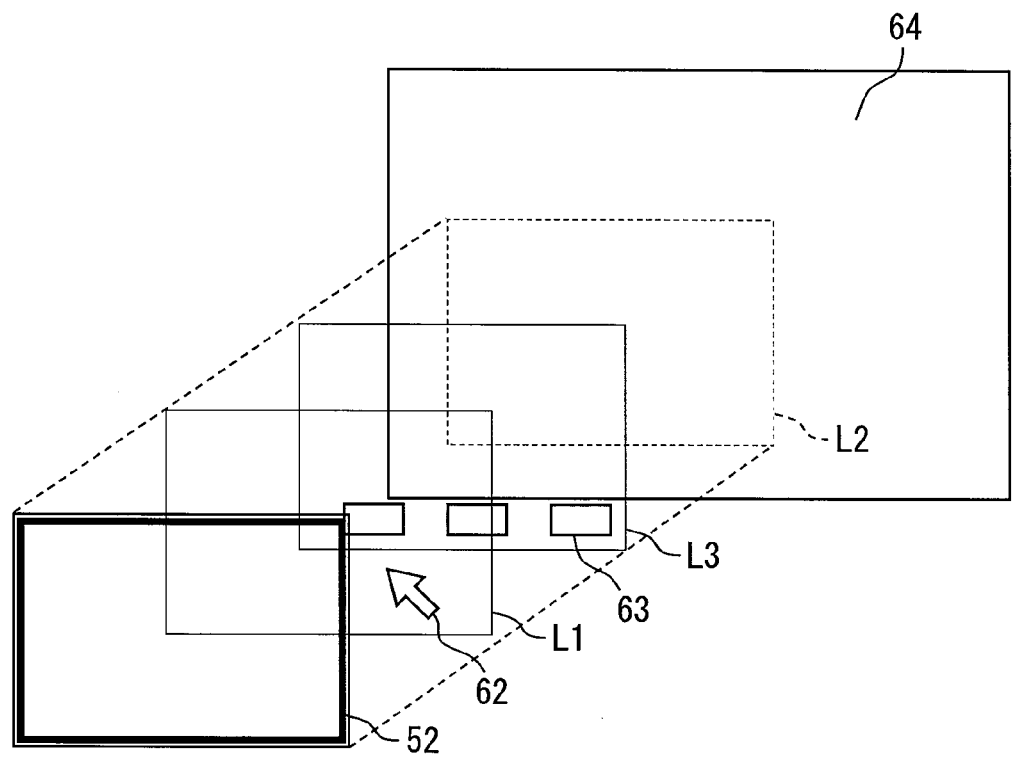
FIG. 4 illustrates overlapping drawing layers to form a display image.

As illustrated in FIG. 4, the display image 60 contains several overlapping drawing layers including a map layer L2, an object layer L3, and a pointer layer L1. The map layer L2 draws the map 64. The object layer L3 draws the icon 63. The pointer layer L1 draws the pointer 62. Sizes of the layers L1 through L3 adjust to the size of the display screen 52.

The following describes in detail configurations of the remote manipulation apparatus 100 and the navigation apparatus 50. As illustrated in FIG. 1, the remote manipulation apparatus 100 is connected to a Controller Area Network (CAN) bus 90 and an external battery 95. The CAN bus 90 provides a transmission path to transmit data between various onboard apparatuses over an in-vehicle network that interconnects a plurality of onboard apparatuses mounted on the vehicle. The remote manipulation apparatus 100 can communicate with the remotely positioned navigation apparatus 50 using the CAN bus 90.

The remote manipulation apparatus 100 includes power supply interfaces 21 and 22, a communication control circuit 23, a communication interface 24, the touch sensor 31, the push switch 35, and a manipulation control circuit 33. The power supply interfaces 21 and 22 stabilize power supplied from the battery 95 and supplies the power to the manipulation control circuit 33. The power supply interface 21 is always supplied with power from the battery 95. The power supply interface 22 is supplied with power from the battery 95 when a vehicle's accessory (ACC) power supply is turned on to power a switch 93.

The communication control circuit 23 and the communication interface 24 output information processed by the manipulation control circuit 33 to the CAN bus 90 and acquire information output from the other onboard apparatuses to the CAN bus 90. The communication control circuit 23 and the communication interface 24 are interconnected with each other through signal line TX for transmission and signal line RX for reception.

As illustrated in FIGS. 1, 2, and 5, the capacitance-type touch sensor 31 detects manipulation of finger F to the above-mentioned manipulation surface 32 formed into a rectangular plate. The touch sensor 31 is formed of an electrode extending along the x-axis direction and an electrode extending along the y-axis direction that are arranged in a grid pattern. The electrodes are connected to the manipulation control circuit 33. The touch sensor 31 is covered with an insulating sheet made of an insulating material that forms the manipulation surface 32.

As will be described later, the manipulator manipulates his or her finger F in the x-, y-, or z-coordinate direction on and over the manipulation surface 32 to move the image portion 61 (see FIG. 3) displayed on the display screen 52. The push switch 35 is positioned opposite the palm rest 39 so that the manipulation surface 32 is sandwiched between them. Manipulator's finger F presses the push switch 35 to select the icon 63 (see FIG. 3) displayed on the display screen 52.

The manipulation control circuit 33 as illustrated in FIG. 1 includes a processor, RAM, and flash memory. The processor performs various arithmetic processes. The RAM functions as a work area for arithmetic processes. The flash memory stores programs used for arithmetic processes. The manipulation control circuit 33 is connected to the power supply interfaces 21 and 22, the communication control circuit 23, the touch sensor 31, and the push switch 35.

As illustrated in FIGS. 1, 2, and 5, the manipulation control circuit 33 executes a predetermined program to measure an electric potential at each electrode of the touch sensor 31. The manipulation control circuit 33 thereby acquires a sensitivity value as a measurement value from the sensor 31. An electric charge is stored between the electrode and manipulator's finger F when manipulator's finger F approaches or touches the manipulation surface 32 so that the insulating sheet is sandwiched between the electrode and manipulator's finger F. The manipulation control circuit 33 detects x-, y-, and z-coordinates using a calculation process based on a sensitivity value that varies with a charge amount stored at each electrode. The x- and y-coordinates indicate a relative manipulation position (hereinafter referred to as a "relative position") of finger F that approaches or touches the manipulation surface 32. The z-coordinate corresponds to a distance (hereinafter referred to as "manipulation entity distance d," see FIG. 6A) from the manipulation surface 32 to finger F. According to the embodiment, the sensitivity value decreases as manipulation entity distance d decreases. The sensitivity value increases as manipulation entity distance d increases.

The manipulation control circuit 33 also detects a press of manipulator's finger F on the push switch 35. The manipulation control circuit 33 outputs coordinates indicating the position of finger F and the presence or absence of pressing manipulation on the push switch 35 to the CAN bus 90 via the communication control circuit 23 and the communication interface 24.

The navigation apparatus 50 as illustrated in FIGS. 1 and 2 is connected to the CAN bus 90 so as to be communicable with the remote manipulation apparatus 100 and includes a display control circuit 53 and a liquid crystal display 51. The display control circuit 53 includes a processor, RAM, a graphic processor, and graphic RAM. The processor performs various arithmetic processes. The RAM functions as a work area for arithmetic processes. The graphic processor performs an image drawing process. The graphic RAM functions as a work area for drawing processes. The display control circuit 53 also includes flash memory, a communication interface, and a video output interface. The flash memory stores data used for arithmetic processes and drawing processes. The communication interface is connected to the CAN bus 90. The video output interface outputs drawn image data to the liquid crystal display 51. The display control circuit 53 draws the display image 60 displayed on the display screen 52 based on information acquired from the CAN bus 90. The display control circuit 53 outputs image data for the drawn display image 60 to the liquid crystal display 51 as needed via the video output interface.

The liquid crystal display 51 is a dot-matrix display apparatus that provides color display by controlling pixels arrayed on the display screen 52. The liquid crystal display 51 displays video by continuously forming image data acquired from the display control circuit 53 on the display screen 52.

Figure 6:
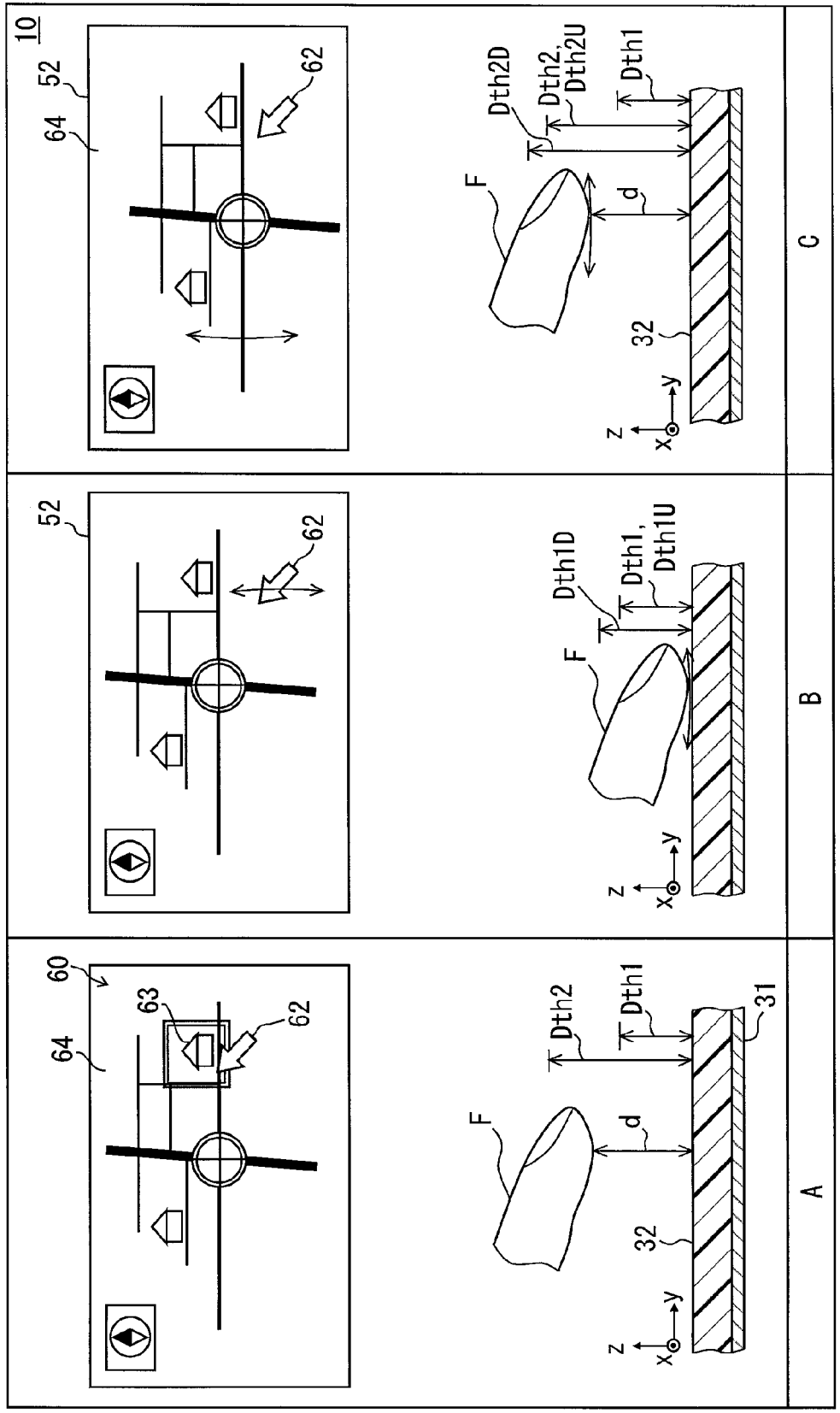
FIG. 6 illustrates how the remote manipulation apparatus according to the first embodiment changes an image portion associated with a finger movement according to a manipulation entity distance from the manipulation surface to a finger.

FIG. 6B illustrates that manipulation entity distance d (see FIG. 6A) is shorter than predetermined first threshold distance Dth1. In this case, the display system 10 associates manipulation of moving finger F along the xy plane with the pointer control to move the pointer 62. FIG. 6C illustrates that manipulation entity distance d exceeds first threshold distance Dth1 and is shorter than second threshold distance Dth2 that is longer than first threshold distance Dth1. In this case, the display system 10 associates manipulation of moving finger F along the xy plane with the map control to move the map 64.

First threshold distance Dth1 used to change the association is set to 0.5 to 1 cm, for example. Second threshold distance Dth2 is set to 2 to 3 cm, for example.

The first embodiment provides definitions (1) through (3) described below based on the threshold distances.

(1) The space contained between the manipulation surface 32 and first threshold distance Dth1 is defined as a contact manipulation area. A manipulation state in which finger F is positioned to the contact manipulation area is defined as "ongoing contact manipulation." Manipulation on the pointer 62 whose input condition is less than first threshold distance Dth1 is defined as "contact manipulation." In other words, the definition of "contact manipulation" includes the state of finger F in direct contact with the manipulation surface 32 and the state of finger F floating over the manipulation surface 32 by first threshold distance Dth1 (e.g., 0.5 to 1 cm).

(2) The space contained between first threshold distance Dth1 and second threshold distance Dth2 is defined as an aerial manipulation area. A manipulation state in which finger F is positioned to the aerial manipulation area is defined as "ongoing aerial manipulation." Manipulation on the map 64 whose input condition exceeds first threshold distance Dth1 and is less than second threshold distance Dth2 (including the aerial manipulation area) is defined as "aerial manipulation."

(3) The space above the manipulation surface 32 over second threshold distance Dth2 is defined as a distant area. A manipulation state in which finger F is positioned to the distant area is defined as "distanced state."

The display system 10 provides a hysteresis for each of first threshold distance Dth1 and second threshold distance Dth2 to avoid frequent changes in the image portions 62 and 64 associated with manipulation of finger F. In more detail, FIG. 6B illustrates association between the pointer control and the contact manipulation, namely, the movement manipulation of finger F in the contact manipulation area. In this case, the manipulation control circuit 33 (see FIG. 1) extends first threshold distance Dth1 from the most recent distance (hereinafter referred to as "uppermost first threshold distance Dth1U") to downmost first threshold distance Dth1D. FIG. 6B illustrates association between the map control and the aerial manipulation, namely, the movement manipulation of finger F in the aerial manipulation area. In this case, the manipulation control circuit 33 extends the second threshold distance Dth2 from the most recent distance (hereinafter referred to as "uppermost second threshold distance Dth2U") to downmost second threshold distance Dth2D.

The manipulation control circuit 33 (see FIG. 1) can switch between inhibition mode and permission mode. The inhibition mode inhibits association between the manipulation using finger F and the map control. The permission mode permits this association. When the manipulation authorization is set to the inhibition mode, the image portions 62 through 64 contained in the display image 60 eventually do not move even if finger F positioned in the aerial manipulation area moves therein as illustrated in FIG. 6A. The manipulation control circuit 33 according to the embodiment (see FIG. 1) previously stores authorization manipulation that changes the inhibition mode to the permission mode. The authorization manipulation moves finger F closer to the manipulation surface 32 than first threshold distance Dth1. As illustrated in FIG. 6B, when finger F is manipulated to move into the contact manipulation area from the distant area, the manipulation authorization changes from inhibition mode to the permission mode. In other words, the inhibition mode changes to the permission mode once the finger touches the manipulation surface 32 of the touch sensor 31.

Figure 7:
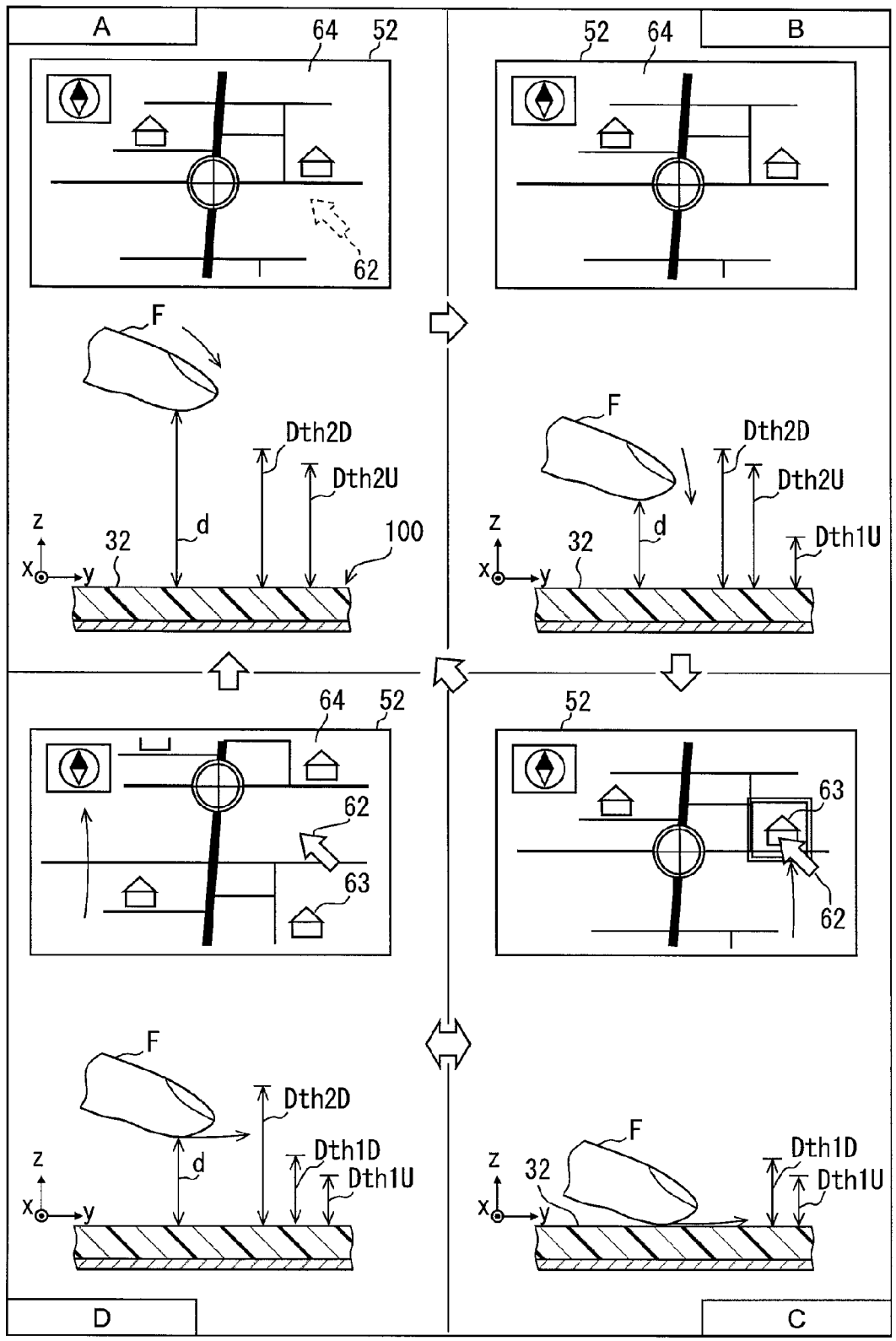
FIG. 7 illustrates a sequence of manipulator's manipulations to select an icon.

With reference to FIG. 7, the following describes a sequence of manipulator's manipulations to select any icon 63 in the display system 10 described thus far.

FIG. 7A illustrates that the manipulator starts allowing finger F to approach the manipulation surface 32. Finger F may be previously positioned away from the manipulation surface 32 due to manipulation of turning on the ACC power or driving the vehicle. The manipulator then moves finger F toward the manipulation surface 32 as illustrated in FIG. 7A. According to the state as illustrated in FIG. 7A, manipulation entity distance d from the manipulation surface 32 to finger F still exceeds uppermost second threshold distance Dth2U. The state of positioning finger F to the distant area thus prevents the map 64 and the pointer 62 on the display screen 52 from moving in association with the movement of finger F.

FIG. 7B illustrates a state in which finger F moves from the distant area in FIG. 7A to the aerial manipulation area so that manipulation entity distance d is shorter than uppermost second threshold distance Dth2U. In the state illustrated in FIG. 7B, the manipulation authorization remains the inhibition mode. Therefore, the aerial manipulation to move finger F is not associated with the map control even if manipulation entity distance d exceeds uppermost first threshold distance Dth1U and is shorter than downmost second threshold distance Dth2D. The manipulator cannot move the map 64 on the display screen 52 even if he or she moves finger F along the manipulation surface 32. In other words, the map 64 does not move even if the manipulator inadvertently moves finger F.

FIG. 7C illustrates a state in which finger F moves from the aerial manipulation area in FIG. 7B to the contact manipulation area so that manipulation entity distance d (see FIG. 7B) is shorter than uppermost first threshold distance Dth1U. In the state illustrated in FIG. 7C, the contact manipulation to move finger F is associated with the pointer control because manipulation entity distance d is shorter than downmost first threshold distance Dth1D. Therefore, the manipulator can remotely manipulate the pointer 62 according to the contact manipulation to move finger F along the xy plane. The manipulator can: allow the pointer 62 to overlap any icon 63; press the push switch 35 (see FIG. 5); and select the icon 63. In addition, a manipulation may be defined as allowing finger F to move to be closer to the manipulation surface 32 than uppermost first threshold distance Dth1U. As described above, such a manipulation is also stored in the manipulation control circuit 33 (see FIG. 1) as an authorization manipulation that triggers the permission mode from the inhibition mode. The transition to the state illustrated in FIG. 7C is to perform the manipulation authorization and change the inhibition mode to the permission mode.

FIG. 7D illustrates a state in which finger F moves from the contact manipulation area in FIG. 7C to the aerial manipulation area so that manipulation entity distance d exceeds downmost first threshold distance Dth1D. The transition to the state illustrated in FIG. 7D changes the manipulation authorization to the permission mode. Therefore, the aerial manipulation to move finger F is accepted because manipulation entity distance d exceeds uppermost first threshold distance Dth1U and is shorter than downmost second threshold distance Dth2D. The manipulator can remotely manipulate the map 64 according to the aerial manipulation to move finger F along the xy plane and move any icon 63 to a position for easy selection using the pointer 62. The aerial manipulation is associated with the map control.

The manipulator remotely manipulates the map 64 containing any icon 63 according to the above-mentioned manipulation and then moves finger F from the aerial manipulation area in FIG. 7D to the contact manipulation area in FIG. 7C. The contact manipulation to move finger F is thereby associated with the pointer control. The manipulator can allow the pointer 62 to overlap the icon 63 according to the remote manipulation and select the icon 63.

When completing the manipulation to select the icon 63 as illustrated in FIGS. 7C and 7D, the manipulator moves finger F away from the contact manipulation area as illustrated in FIG. 7A to a position where manipulation entity distance d exceeds downmost second threshold distance Dth2D. The manipulation authorization thereby changes from the permission mode to the inhibition mode. The remote manipulation apparatus 100 awaits a subsequent manipulator's manipulation to select an icon.

With reference to FIGS. 8 through 13, the following describes processes performed by the manipulation control circuit 33 to implement the above-mentioned icon selection manipulation. The manipulation control circuit 33 (see FIG. 1) starts a main process in FIG. 8 when the vehicle's ACC power is turned on.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

At S101, the main process initializes flash memory and then proceeds to S102. At S102, the main process sets the manipulation authorization to the inhibition mode and then proceeds to S103. At S103, the main process determines whether the vehicle's ACC power is turned on. When determining at S103 that the vehicle's ACC power is not turned on, the main process proceeds to S108. At S108, the main process performs a pre-termination process to stop output and then terminates.

When determining at S103 that the vehicle's ACC power is turned on, the main process proceeds to S104. At S104, the main process performs a touch sensor input process (to be described in detail later) and then proceeds to S105. The main process performs the touch sensor input process to update the manipulation state of finger F in relation to the manipulation surface 32 and determines whether the manipulation state is "ongoing contact manipulation," "ongoing aerial manipulation," or "distanced state." If the manipulation state is "ongoing contact manipulation" or "ongoing aerial manipulation" at S104, the main process acquires coordinate information indicating a relative position of finger F in relation to the manipulation surface 32. At S105, the main process performs a push switch input process to update and acquire the presence or absence of manipulation of finger F on the push switch 35 and then proceeds to S106.

At S106, the main process performs a manipulation layer determination process (to be described in detail later) and then proceeds to S107. The main process performs the manipulation layer determination process to update a drawing layer (hereinafter referred to as a "selected layer") to be manipulated and determine to which of layers L1 through L3 the drawing layer corresponds. The selected layer contains the image portion 61 with which the manipulation of finger F is associated.

At S107, the main process performs a communication control process to output a signal indicating the information acquired at S104 through S106 to the CAN bus 90 and then returns to S103. The information output at S107 contains the coordinate information indicating the relative position of finger F, the information indicating the presence or absence of manipulation on the push switch 35, and the information indicating the selected layer. The main process repeats S104 through S107 while the ACC power remains turned on.

The display control circuit 53 acquires the signal indicating the information from the CAN bus 90 while the manipulation control circuit 33 outputs the information by repeating S107. In more detail, the display control circuit 53 determines the image portion 61 to be manipulated based on a layer specification signal indicating the selected layer. The display control circuit 53 changes a position to draw the image portion 61 to be manipulated based on the relative position of finger F, namely, a coordinate signal indicating three-dimensional input position coordinates.

Figure 9:
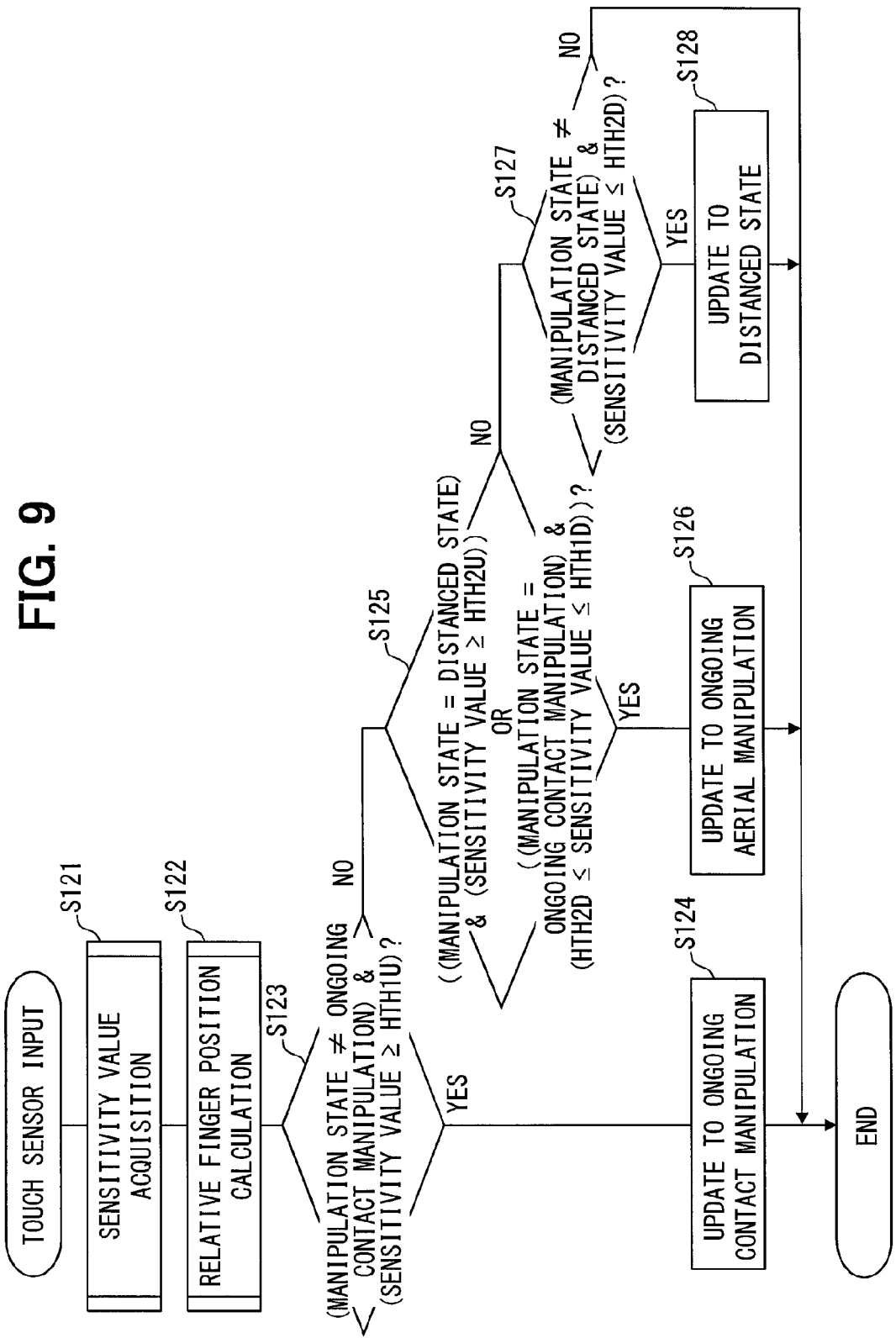
FIG. 9 is a flowchart illustrating a touch sensor input process performed by the manipulation control circuit according to the first embodiment.
Figures 10, 11:
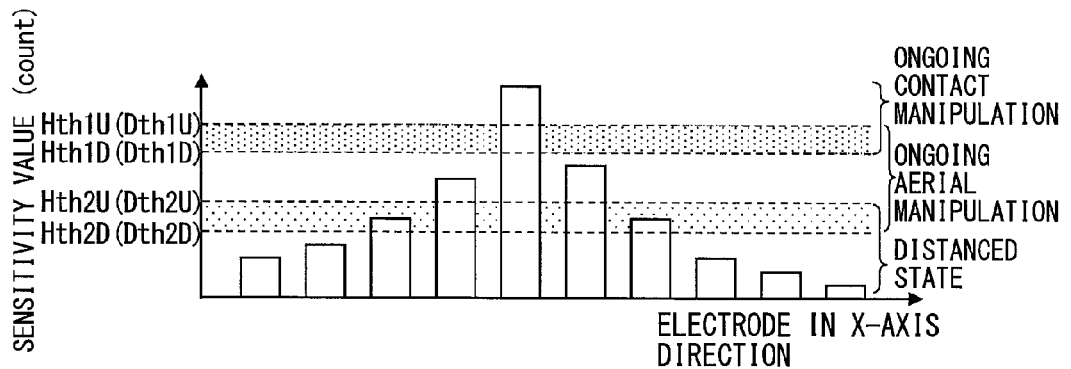
FIG. 10 illustrates relationship between a sensitivity value detected by the touch sensor and a manipulation state determined by the manipulation control circuit in the remote manipulation apparatus according to the first embodiment.
FIG. 11 illustrates sensitivity threshold values stored in the manipulation control circuit according to the first embodiment.

With reference to FIGS. 9 through 11, the following describes in detail the touch sensor input process performed at S104.

At S121, the touch sensor input process performs an acquisition process to acquire a sensitivity value detected at each electrode of the touch sensor 31 and then proceeds to S122. At S122, the touch sensor input process uses the sensitivity value acquired at S121 to calculate x, y, and z coordinates that indicate the relative position of finger F with reference to the manipulation surface 32. The touch sensor input process then proceeds to S123 to determine whether the manipulation using finger F corresponds to the contact manipulation and the aerial manipulation.

With reference to FIG. 10, the following describes the calculation process performed at S122 described above. A sensitivity value illustrated in FIG. 10 increases as the capacitance stored between the manipulation surface 32 and finger F increases. Therefore, a coordinate in the x-axis and y-axis directions to maximize the sensitivity value indicates the relative position of finger F with reference to the manipulation surface 32. In addition, the maximized sensitivity value corresponds to manipulation entity distance d and thus the coordinate in the z-axis direction (see FIG. 6C).

As illustrated in FIG. 11, the manipulation control circuit 33 (see FIG. 1) previously stores uppermost and downmost first sensitivity threshold values Hth1U and Hth1D corresponding to uppermost and downmost first threshold distances Dth1U and Dth1D, respectively. Further, the manipulation control circuit 33 previously stores uppermost and downmost second sensitivity threshold values Hth2U and Hth2D corresponding to uppermost and downmost second threshold distances Dth2U and Dth2D, respectively. In the process at S123 and later illustrated in FIG. 9, the manipulation control circuit 33 compares the maximum sensitivity value acquired at S122 with the sensitivity threshold values Hth1U through Hth2D.

At S123, the touch sensor input process determines whether or not (i) the most recent manipulation state specified by the touch sensor input process differs from the ongoing contact manipulation and simultaneously (ii) the maximum sensitivity value acquired at S121 is greater than or equal to uppermost first sensitivity threshold value Hth1U. If the determination at S123 is affirmed, the touch sensor input process then proceeds to S124, updates the manipulation state to the ongoing contact manipulation, and then terminates. The above-mentioned process updates the manipulation state to the ongoing contact manipulation when finger F approaches the manipulation surface 32 to cross over uppermost first threshold distance Dth1U.

If the determination at S123 is negated, the touch sensor input process then proceeds to S125 and determines whether one of the following two conditions is satisfied. One condition is that (i) the touch sensor input process specifies the distanced state as the most recent manipulation state and simultaneously (ii) the maximum sensitivity value acquired at S121 is greater than or equal to uppermost second sensitivity threshold value Hth2U. The other condition is that (i) the touch sensor input process specifies the ongoing contact manipulation as the most recent manipulation state and simultaneously (ii) the sensitivity value acquired at S121 is smaller than or equal to downmost first sensitivity threshold value Hth1D and is greater than or equal to downmost second sensitivity threshold value Hth2D. If one of the two conditions is satisfied, the touch sensor input process proceeds to S126, updates the manipulation state to the ongoing aerial manipulation, and then terminates. The above-mentioned process updates the manipulation state to the ongoing aerial manipulation when finger F moves away from the manipulation surface 32 to cross over downmost first threshold distance Dth1D (see FIG. 7D) or when finger F approaches the manipulation surface 32 to cross over uppermost second threshold distance Dth2U.

If the determination at S125 is negated, the touch sensor input process proceeds to S127 and determines whether or not (i) the most recent manipulation state specified by the touch sensor input process differs from the distanced state and simultaneously (ii) the maximum sensitivity value acquired at S121 is smaller than or equal to downmost second sensitivity threshold value Hth2D. If the determination at S127 is affirmed, the touch sensor input process proceeds to S128, updates the manipulation state to the distanced state, and then terminates. The above-mentioned process updates the manipulation state to the distanced state when finger F moves away from the manipulation surface 32 to cross over downmost second threshold distance Dth2D.

If the determination at S127 is negated, none of the conditions at S123, S125, and S127 is satisfied. In this case, the touch sensor input process terminates while maintaining the most recent manipulation state specified by the touch sensor input process.

Figure 8:
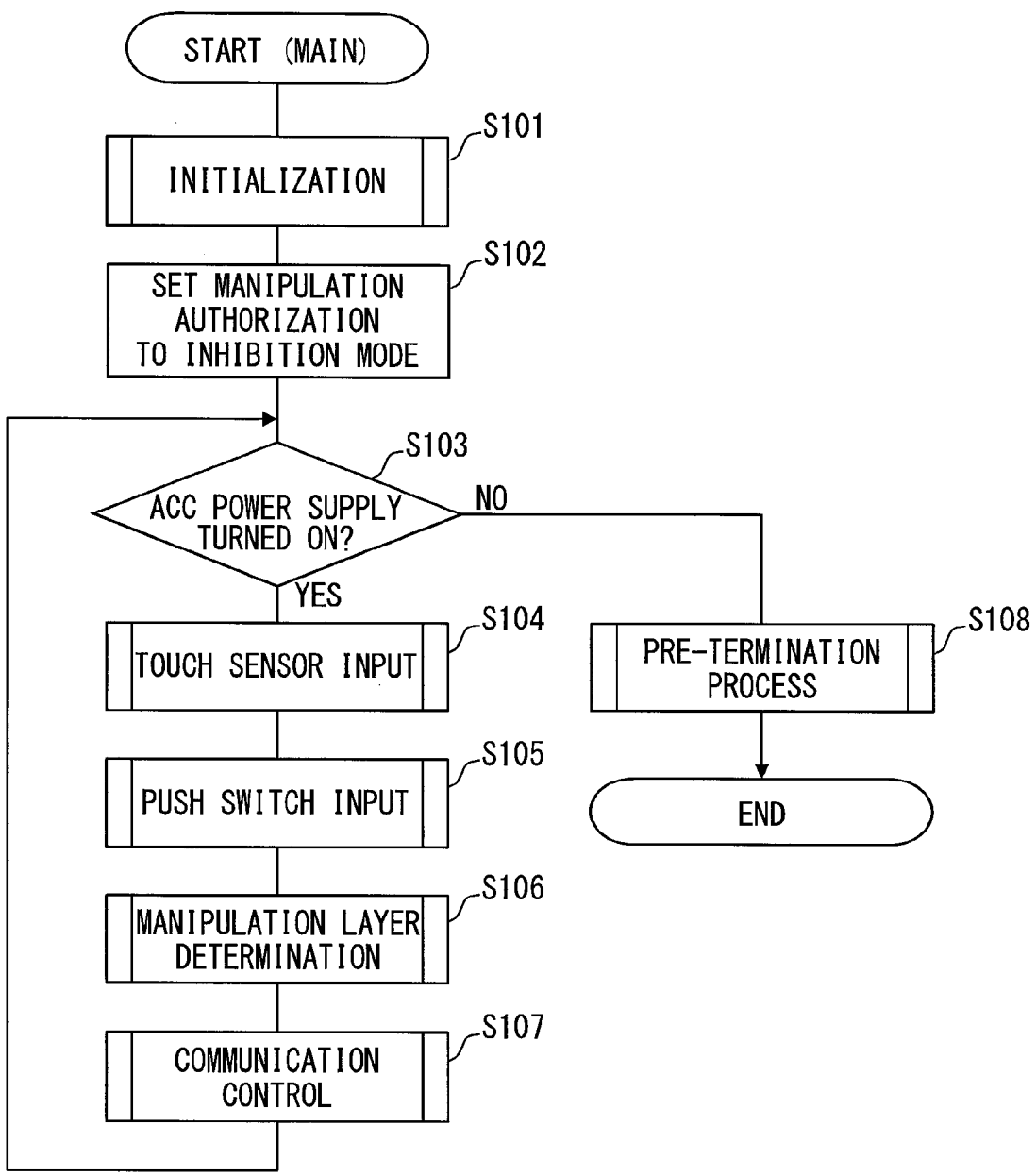
FIG. 8 is a flowchart illustrating a main process performed by a manipulation control circuit in the remote manipulation apparatus according to the first embodiment.
Figure 12:
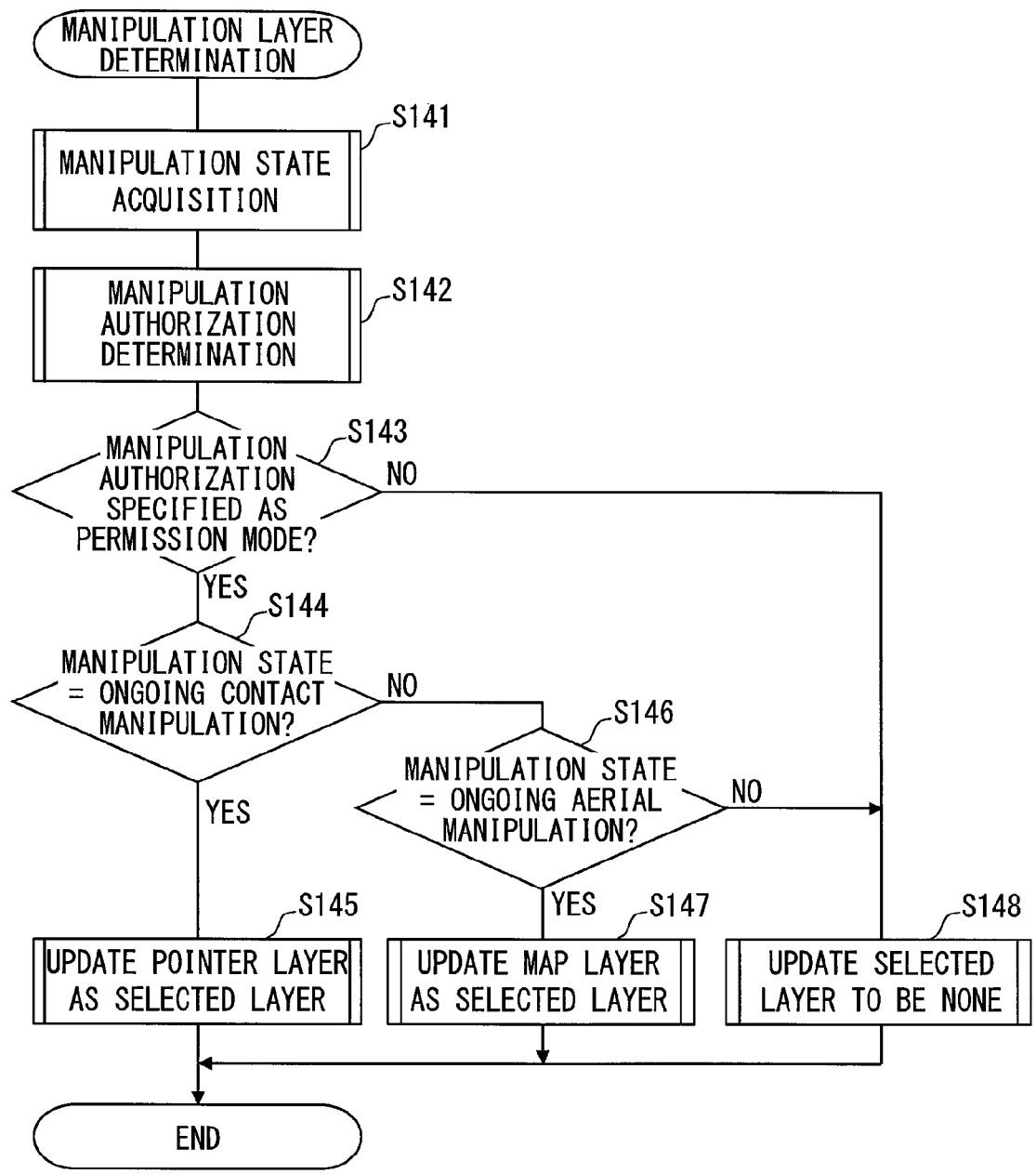
FIG. 12 is a flowchart illustrating a manipulation layer determination process performed by the manipulation control circuit according to the first embodiment.

With reference to FIG. 12, the following describes in detail the manipulation layer determination process performed at S106 (see FIG. 8).

At S141, the manipulation layer determination process acquires the most recent manipulation state updated by the touch sensor input process (see FIG. 9) and then proceeds to S142. At S142, the manipulation layer determination process acquires information about the manipulation authorization updated and acquired by a manipulation authorization determination process (to be described in detail later) and then proceeds to S143. At S143, the manipulation layer determination process determines whether the manipulation authorization acquired at S143 is the permission mode. If it is determined that the manipulation authorization is the inhibition mode, the manipulation layer determination process proceeds to S148, updates the selected layer to be "none," and then terminates.

If the determination at S143 is affirmed, the manipulation layer determination process proceeds to S144 and determines whether or not the manipulation state acquired at S141 is the ongoing contact manipulation. If the determination at S144 is affirmed, the manipulation layer determination process proceeds to S145. The manipulation layer determination process selects and updates the pointer layer L1 as a selected layer so as to associate the contact manipulation with the pointer control and then terminates. If the determination at S144 is negated, the manipulation layer determination process proceeds to S146.

At S146, the manipulation layer determination process determines whether or not the manipulation state acquired at S141 is the ongoing aerial manipulation. If the determination at S146 is affirmed, the manipulation layer determination process proceeds to S147. The manipulation layer determination process selects and updates the pointer layer L2 as a selected layer so as to associate the aerial manipulation with the pointer control and then terminates. If the determination at S146 is negated, the manipulation layer determination process proceeds to S148. The manipulation layer determination process updates the selected layer to be "none," and then terminates.

Figure 13:
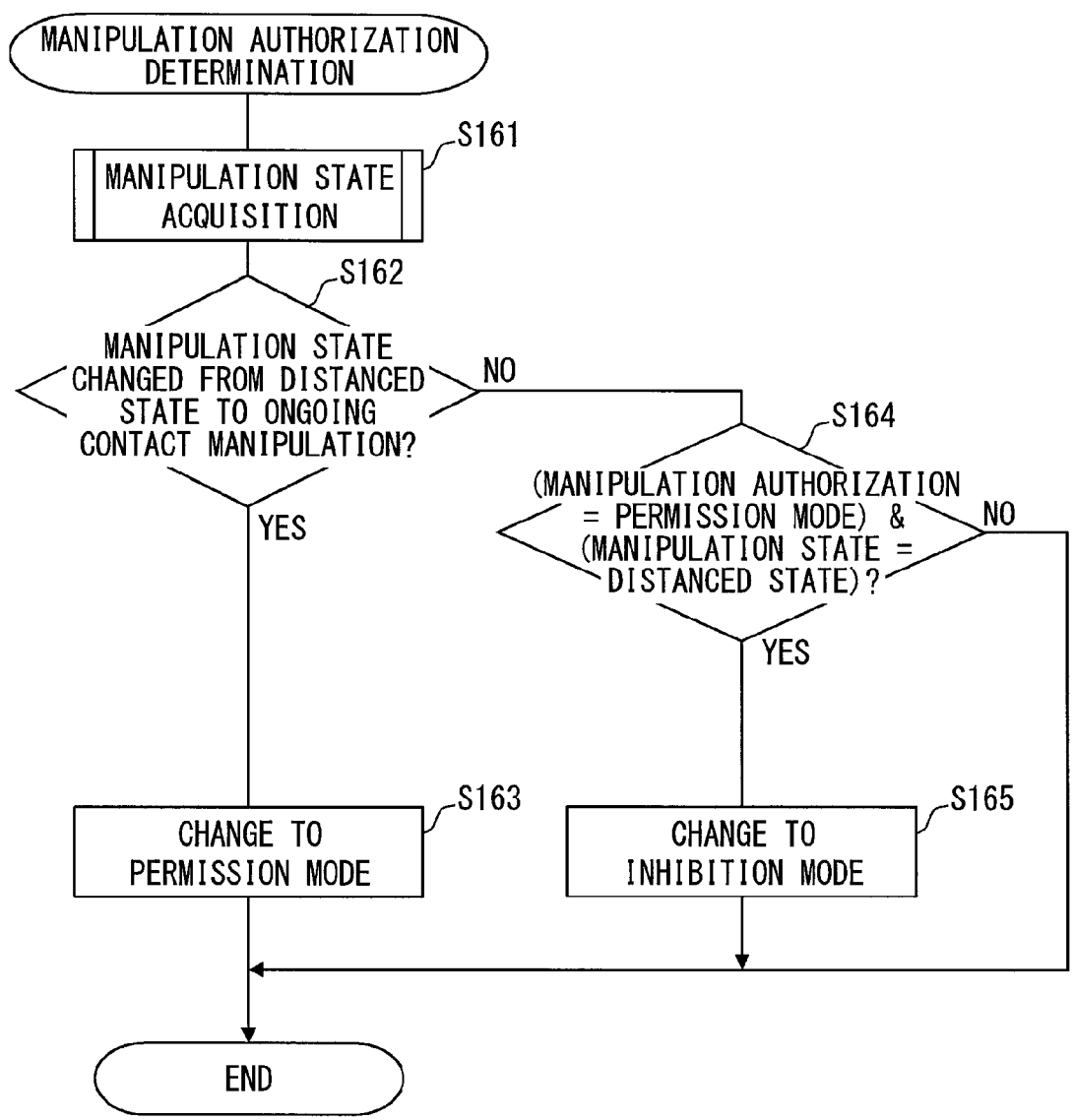
FIG. 13 is a flowchart illustrating a manipulation authorization determination process performed by the manipulation control circuit according to the first embodiment.

With reference to FIG. 13, the following describes in detail the manipulation authorization determination process performed at S142.

At S161, the manipulation authorization determination process acquires the most recent manipulation state (see S124, S126, and S128 in FIG. 9) updated by the touch sensor input process and then proceeds to S162. At S162, the manipulation authorization determination process determines whether or not the manipulation state acquired at S161 includes a change in the above-mentioned authorization manipulation, namely, changing the distanced state to the ongoing contact manipulation. If the determination at S162 is affirmed, the manipulation authorization determination process proceeds to S163. At S163, the manipulation authorization determination process changes the manipulation authorization from the inhibition mode to the permission mode, and then terminates.

If the determination at S162 is negated, the manipulation authorization determination process proceeds to S164. At S164, the manipulation authorization determination process determines whether or not (i) the most recent manipulation authorization specified by the manipulation authorization determination process is the permission mode and simultaneously (ii) the manipulation state acquired at S161 is the distanced state. If the determination at S164 is affirmed, the manipulation authorization determination process proceeds to S165. At S165, the manipulation authorization determination process changes the manipulation authorization from the permission mode to the inhibition mode and then terminates. The above-mentioned process at S164 and S165 returns the manipulation authorization to the inhibition mode based on the movement of finger F from one of the contact manipulation area and the aerial manipulation area to the distant area. If the determination at S164 is negated, the manipulation authorization determination process terminates while maintaining the most recent manipulation authorization specified by the manipulation authorization determination process.

According to the first embodiment described thus far, the manipulation control circuit 33 assumes the manipulation authorization to be the inhibition mode until the authorization manipulation using finger F is performed on the manipulation surface 32. This interrupts association between the aerial manipulation using finger F and the map control. When the pointer control is performed, finger F can be free from being associated with the map control against the manipulator's intention while finger F approaches the manipulation surface 32 closely to be shorter than first threshold distance Dth1.

On the other hand, the manipulation authorization changes from the inhibition mode to the permission mode when finger F approaches the contact manipulation area over the manipulation surface 32. This starts to allow association between the aerial manipulation using finger F and the map control. The manipulator can thereby select one of the pointer 62 and the map 64 and manipulate the selected one while continuing the manipulation on the manipulation surface 32 using finger F.

The above-mentioned feature can avoid complication of manipulation to move the intended image portion 61 and reduce the manipulator's inadvertent movement of the image portion 61. This enables to provide the remote manipulation apparatus 100 that excels in manipulability of the image portion 61 displayed on the display screen 52.

The touch sensor 31 according to the first embodiment can detect the position of finger F distanced from the manipulation surface 32. Therefore, the manipulation control circuit 33 can acquire manipulation entity distance d from the sensitivity value detected by the touch sensor 31. The touch sensor 31 and the manipulation control circuit 33 acquire manipulation entity distance d in cooperation with each other. Complication of manipulation can be thereby avoided due to the configuration of the remote manipulation apparatus 100 that excels in manipulability.

The first embodiment provides a hysteresis for each of first threshold distance Dth1 and second threshold distance Dth2. This can reduce changes against the manipulator's intention on the image portion 61 to be manipulated. It is possible to further improve the manipulability of the remote manipulation apparatus 100 regarding the manipulation to move the intended image portion 61.

The first embodiment stores the authorization manipulation defined as the manipulation to allow finger F to approach the contact manipulation area over the manipulation surface 32. The inhibition mode remains active until finger F approaches the manipulation surface 32 closely to be shorter than first threshold distance Dth1. Finger F may approach the manipulation surface 32 as illustrated in FIG. 6C while finger F is moving to touch the manipulation surface 32 in order to provide the pointer control as illustrated in FIG. 6B. In such a case, finger F can be free from being associated with the map control (see FIG. 6C) against the manipulator's intention. Therefore, the remote manipulation apparatus 100 can reliably provide excellent manipulability.

The display image 60 according to the first embodiment is formed by overlapping the drawing layers L1 through L3. When finger F is positioned to the contact manipulation area, using the pointer layer L1 as a selected layer can reliably associate the contact manipulation using finger F with the pointer control. When finger F is positioned to the aerial manipulation area, using the map layer L2 as a selected layer can reliably associate the aerial manipulation using finger F with the map control. As described above, one of the drawing layers L1 through L3 is defined as a selected layer to be manipulated. This can improve the reliability of manipulation to change the image portion 61 to be manipulated according to manipulation entity distance d.

In the first embodiment, the touch sensor 31 and the manipulation control circuit 33 correspond to a "detection section, device, or means" and an "acquisition section, device, or means." The manipulation control circuit 33 corresponds to a "manipulation determination section, device, or means," an "association section, device, or means," an "authorization manipulation determination section, device, or means," and a "mode changeover section, device, or means." The display control circuit 53 corresponds to a display control section, device, or means. The manipulation surface 32 corresponds to a "manipulation portion." The display screen 52 corresponds to a "display portion." The pointer 62 corresponds to a "first image portion" and a "pointer portion." The icon 63 corresponds to a "selected image portion." The map 64 corresponds to a "second image portion" and a "non-pointer portion." The pointer layer L1 corresponds to a "first image layer." The map layer L2 corresponds to a "second image layer." The pointer control corresponds to a "first image control." The map control corresponds to a "second image control." The remote manipulation apparatus 100 corresponds to a "manipulation apparatus." The sensitivity value corresponds to a "measurement value." The manipulator's finger F corresponds to a "manipulation entity." While the first embodiment has described examples of these, the present disclosure is obviously not limited thereto.

In the present application, "shudan" in Japanese signifies "means" or "device" in English.

(Second Embodiment)

Figure 14:
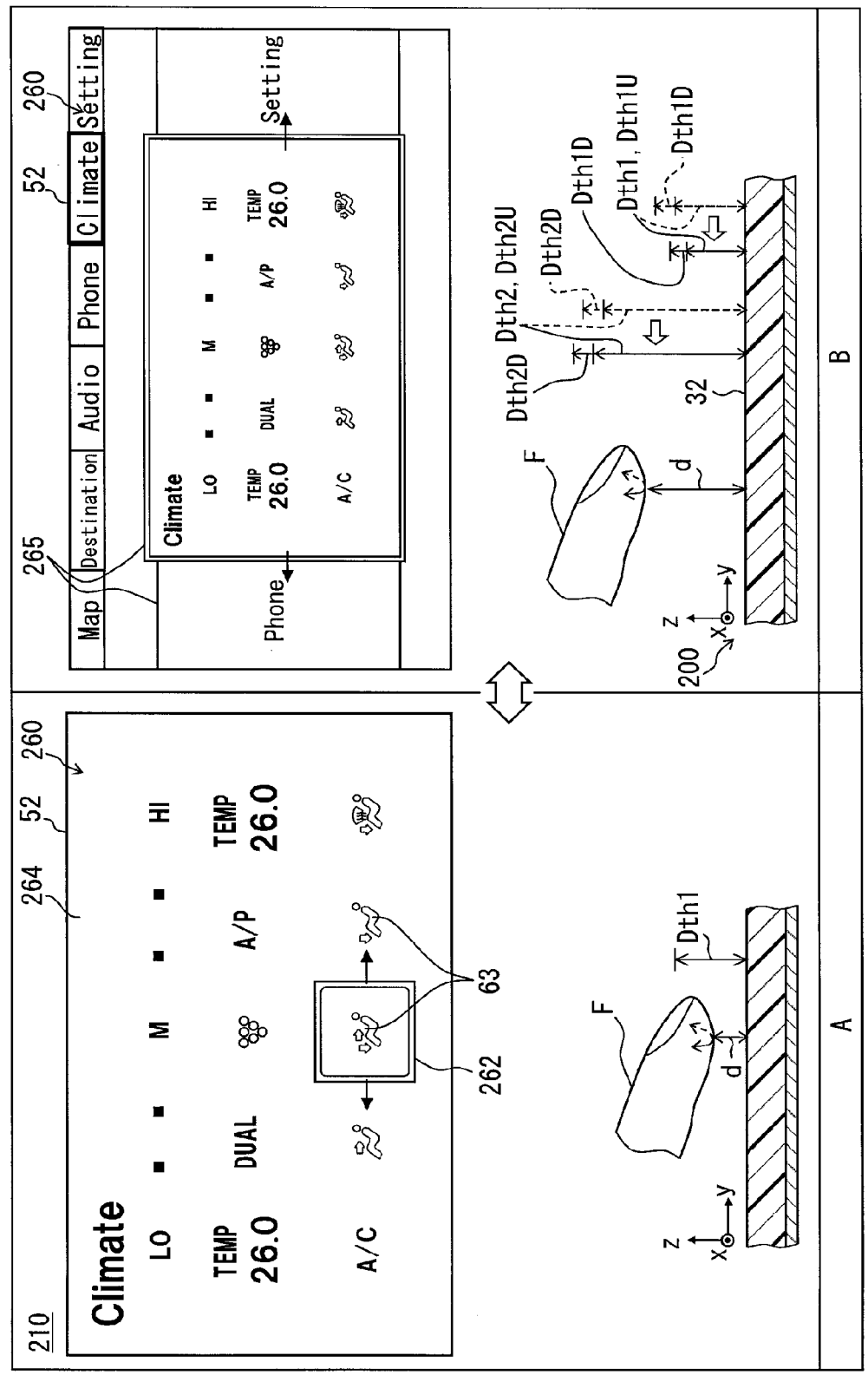
FIG. 14 illustrates how the remote manipulation apparatus according to a second embodiment changes an image portion associated with a finger movement according to a manipulation entity distance from the manipulation surface to a finger.

A second embodiment is a modification of the first embodiment and is illustrated in FIGS. 14 through 19. As illustrated in FIG. 14, a display system 210 according to the second embodiment allows a display image 260 to vary with manipulation entity distance d. In more detail, FIG. 14A illustrates that manipulation entity distance d is shorter than first threshold distance Dth1. In this case, the display screen 52 displays the display image 260 representing one of sub-menus (to be described in detail later) such as an air-conditioning menu for controlling an air-conditioning apparatus mounted on the vehicle. The air-conditioning menu contains the icon 63, a focus 262, and a background portion 264. The focus 262 is shaped into a rectangular frame and is used to select the icon 63. The background portion 264 provides a background for the icon 63 and the focus 262. The contact manipulation moves finger F in the contact manipulation area along the xy plane and is associated with focus control to move the focus 262.

FIG. 14B illustrates that manipulation entity distance d exceeds first threshold distance Dth1 and is shorter than second threshold distance Dth2. In this case, the display screen 52 displays a main menu image as the display image 260. The main menu image contains a plurality of sub-menus 265 such as the above-mentioned air-conditioning menu, a vehicle setting menu, a phone menu, and an audio menu (see FIG. 15A). The aerial manipulation moves finger F in the aerial manipulation area along the xy plane and is associated with sub-menu control to move the sub-menus 265.

The remote manipulation apparatus 200 according to the second embodiment expands the aerial manipulation area when the vehicle is traveling. Specifically, first threshold distances Dth1U and Dth1D (see the solid-line arrows in FIG. 14B) when the vehicle is traveling are shorter than first threshold distances Dth1U and Dth1D (see the broken-line arrows in FIG. 14B) when the vehicle is stopped. On the other hand, second threshold distances Dth2U and Dth2D (see the solid-line arrows in FIG. 14B) when the vehicle is traveling are longer than second threshold distances Dth2U and Dth2D (see the broken-line arrows in FIG. 14B) when the vehicle is stopped.

The authorization manipulation according to the second embodiment differs from the authorization manipulation according to the first embodiment and continuously positions finger F to one of the aerial manipulation area and the contact manipulation area for a predetermined time (hereinafter referred to as "permission wait time") such as 0.5 through 2 seconds. As illustrated in FIG. 14, finger F moves from the distant area into the contact manipulation area or the aerial manipulation area. After a lapse of the permission wait time, the aerial manipulation moves finger F along the xy plane to move the sub-menu 265 as illustrated in FIG. 14B.

Figure 15:
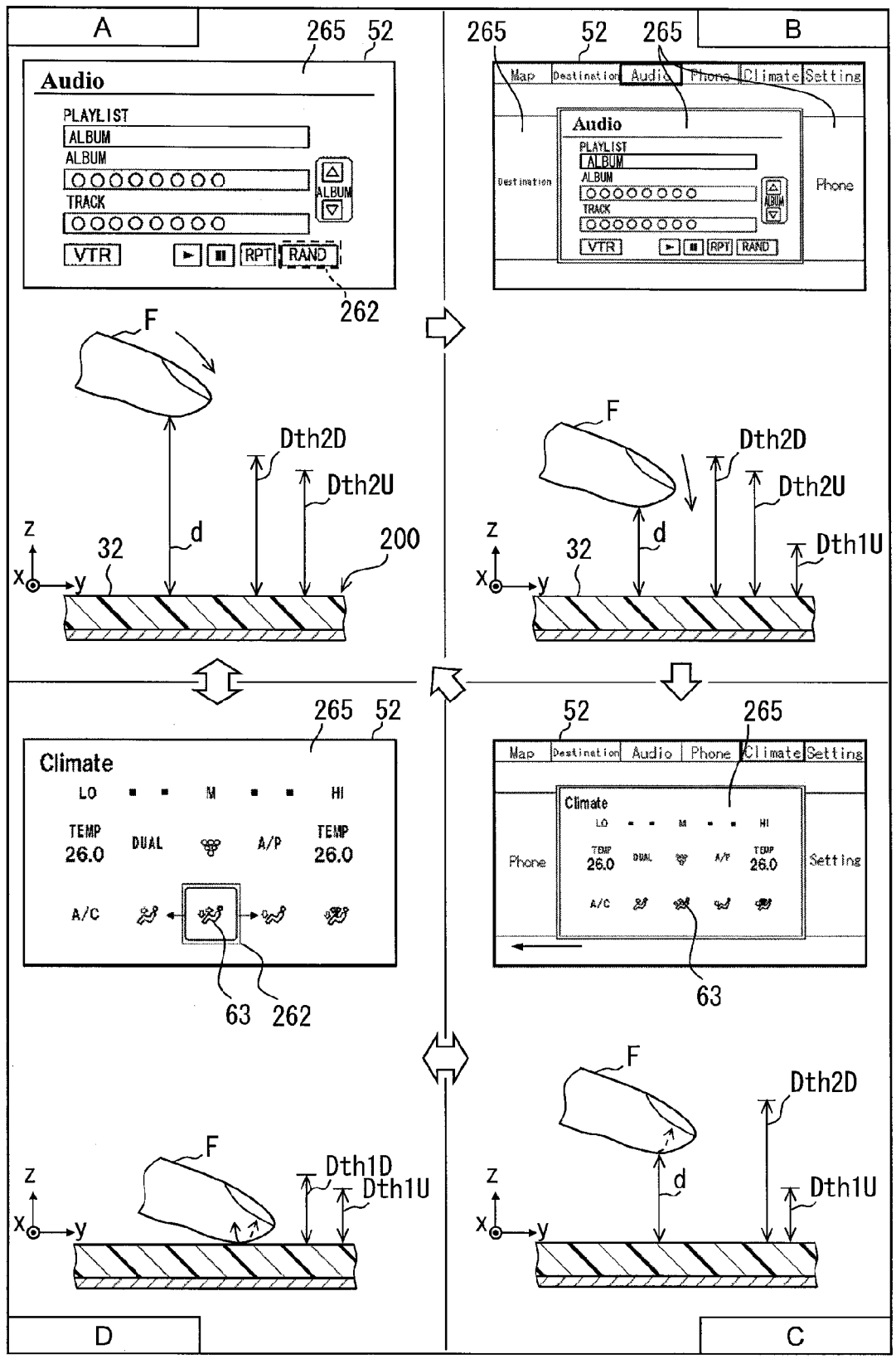
FIG. 15 illustrates a sequence of manipulator's manipulations to select an icon.

With reference to FIG. 15, the following describes a sequence of manipulator's manipulations to select any icon 63 according to the above-mentioned configuration.

FIG. 15A illustrates the manipulator starts the manipulation to allow finger F to approach the manipulation surface 32. In the state illustrated in FIG. 15A, manipulation entity distance d between the manipulation surface 32 and finger F exceeds uppermost second threshold distance Dth2U. When finger F is positioned to the distant area, there occurs no movement associated with the movement of finger F on the sub-menu 265 and the focus 262 in the display screen 52.

FIG. 15B illustrates that finger F moves from the distant area to the aerial manipulation area so that manipulation entity distance d is shorter than uppermost second threshold distance Dth2U. In the state illustrated in FIG. 15B, the manipulation authorization remains the inhibition mode. Accordingly, there occurs no association between the aerial manipulation to move finger F and the sub-menu control even if manipulation entity distance d exceeds uppermost first threshold distance Dth1U and is shorter than downmost second threshold distance Dth2D. The display screen 52 does not change the display even if the manipulator inadvertently moves finger F.

According to the second embodiment, the manipulation control circuit 33 (see FIG. 1) stores the authorization manipulation defined as the manipulation to continuously position finger F to one of the aerial manipulation area and the contact manipulation area. As illustrated in FIG. 15B, the manipulation authorization changes from the inhibition mode to the permission mode when finger F is positioned to the aerial manipulation area for the permission wait time or longer. When the aerial manipulation to move finger F is associated with the sub-menu control, the display of the display screen 52 changes to a main menu image capable of collectively moving (hereinafter referred to as "scrolling") the sub-menus 265. As illustrated in FIG. 15C, the manipulator can move the sub-menu 265 containing any icon 63 to the center of the display screen 52 by remotely controlling the sub-menus 265 according to the aerial manipulation to move finger F in the x direction. According to the example, an Audio menu image illustrated in FIG. 15B changes to a Climate menu image (air-conditioning menu image) illustrated in FIG. 15C.

FIG. 15D illustrates a state in which finger F is moved from the aerial manipulation area to the contact manipulation area so that manipulation entity distance d (see FIG. 15C) is shorter than uppermost first threshold distance Dth1U. According to the state illustrated in FIG. 15D, the control associated with the manipulation to move finger F changes from the sub-menu control to the focus control based on the fact that manipulation entity distance d is shorter than downmost first threshold distance Dth1D. The display screen 52 thereby displays in full screen the specific sub-menu 265 (e.g., air-conditioning menu) that was displayed at the center of the display screen 52. The manipulator can remotely manipulate the focus 262 according to the contact manipulation to move finger F along the xy plane. The manipulator can: allow the focus 262 to overlap any icon 63; press the push switch 35 (see FIG. 5); and thereby select the icon 63.

After finishing the manipulation as illustrated in FIGS. 15C and 15D, the manipulator, as illustrated in FIG. 15A, moves finger F away to a position where manipulation entity distance d exceeds downmost second threshold distance Dth2D. The manipulation authorization thereby changes from the permission mode to the inhibition mode. The remote manipulation apparatus 200 then awaits the manipulator's subsequent manipulation to select an icon.

With reference to FIGS. 16 through 19, the following describes processes performed by the manipulation control circuit 33 (see FIG. 1) in order to implement the above-mentioned icon selection manipulation. The main process according to the second embodiment substantially equals the main process (see FIG. 8) according to the first embodiment. First, with reference to FIGS. 16 and 17, the following describes in detail a touch sensor input process according to the second embodiment.

Figure 16:
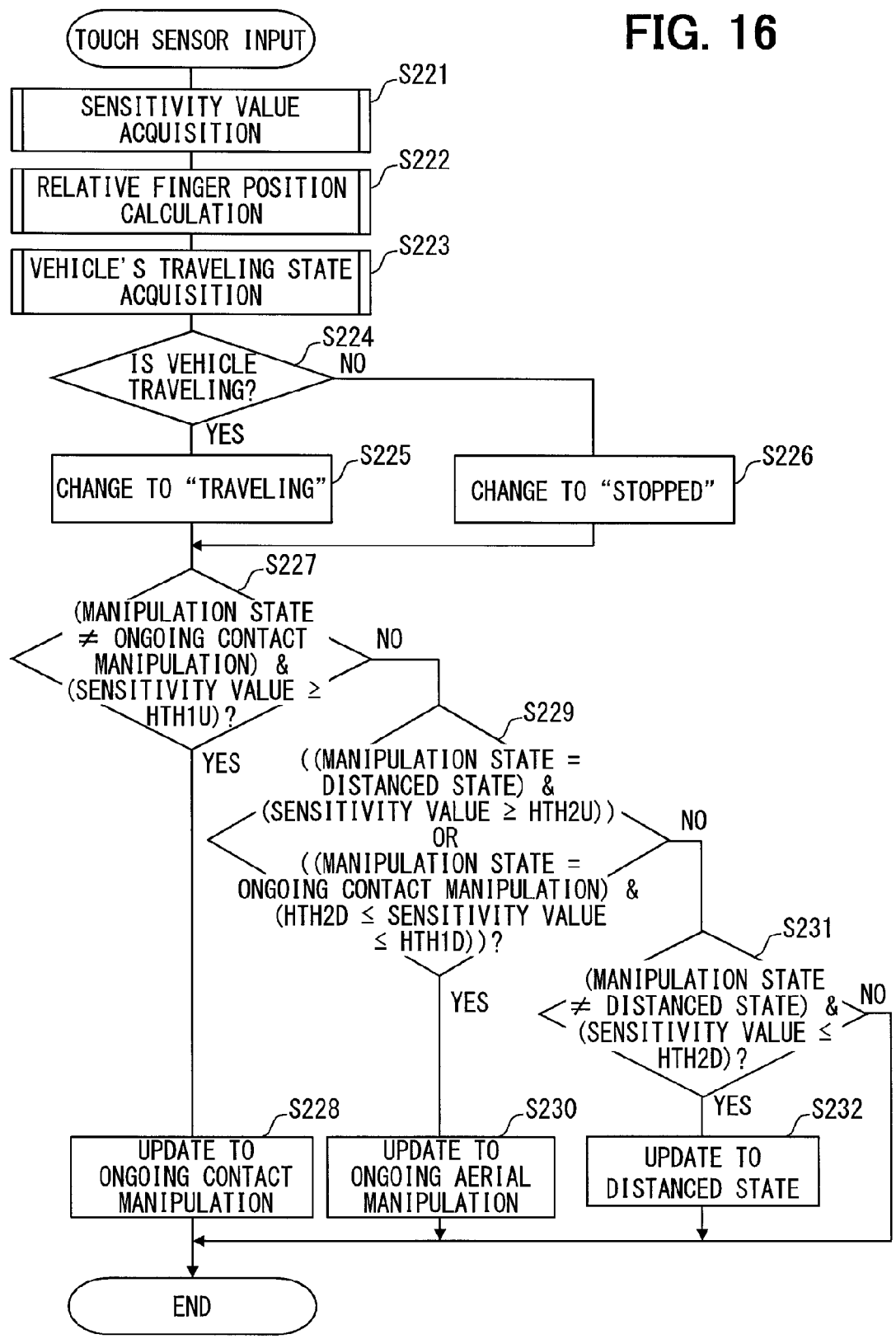
FIG. 16 is a flowchart illustrating a touch sensor input process performed by the manipulation control circuit according to the second embodiment.

S221 and S222 in FIG. 16 substantially equal S121 and S122 (see FIG. 9) in the first embodiment. At S223, the touch sensor input process performs an acquisition process to acquire the vehicle's traveling state and then proceeds to S224. Specifically, at S223, the touch sensor input process acquires the vehicle's traveling speed output to the CAN bus 90 (see FIG. 1) from a meter control circuit 56 (see FIG. 1).

At S224, the touch sensor input process determines based on the traveling speed acquired at S223 whether the vehicle is traveling. At S224, the touch sensor input process determines that the vehicle is traveling if the traveling speed acquired at S223 exceeds 10 km/h. In this case, the touch sensor input process proceeds to S225. At S225, the touch sensor input process chooses from sensitivity threshold values Hth1U through Hth2D corresponding to threshold values for "traveling" in FIG. 17 and then proceeds to S227 in FIG. 16. At S224, the touch sensor input process determines that the vehicle is not traveling if the traveling speed acquired at S223 is lower than or equal to 10 km/h. In this case, the touch sensor input process proceeds to S226. At S226, the touch sensor input process chooses from sensitivity threshold values Hth1U through Hth2D corresponding to threshold values for "stopped" in FIG. 17 and then proceeds to S227 in FIG. 16. The touch sensor input process performs S227 through S232 substantially equal to S123 through S128 (see FIG. 9) in the first embodiment.

FIG. 17 illustrates sensitivity threshold values read into the manipulation control circuit 33 (see FIG. 1) at S225 and S226 described above. First sensitivity threshold values Hth1U and Hth1D when the vehicle is traveling are larger than first sensitivity threshold values Hth1U and Hth1D when the vehicle is stopped. Therefore, as illustrated in FIG. 14B, first threshold distances Dth1U and Dth1D when the vehicle is traveling are shorter than first threshold distances Dth1U and Dth1D when the vehicle is stopped. As illustrated in FIG. 17, second sensitivity threshold values Hth2U and Hth2D when the vehicle is traveling are larger than second sensitivity threshold values Hth2U and Hth2D when the vehicle is stopped. Therefore, as illustrated in FIG. 14B, second threshold distances Dth2U and Dth2D when the vehicle is traveling are longer than second threshold distances Dth2U and Dth2D when the vehicle is stopped. Consequently, the aerial manipulation area is expanded when the vehicle is traveling.

With reference to FIG. 18, the following describes in detail a manipulation layer determination process according to the second embodiment. S241 through S244, S246, and S248 in FIG. 18 substantially equal S141 through S144, S146, and S148 (see FIG. 12) in the first embodiment. At 5245, the manipulation layer determination process selects and updates a focus layer to draw the focus 262 as a selected layer and then terminates. At S247, the manipulation layer determination process selects and updates a sub-menu layer to draw the sub-menu 265 as a selected layer and then terminates.

Figure 19:
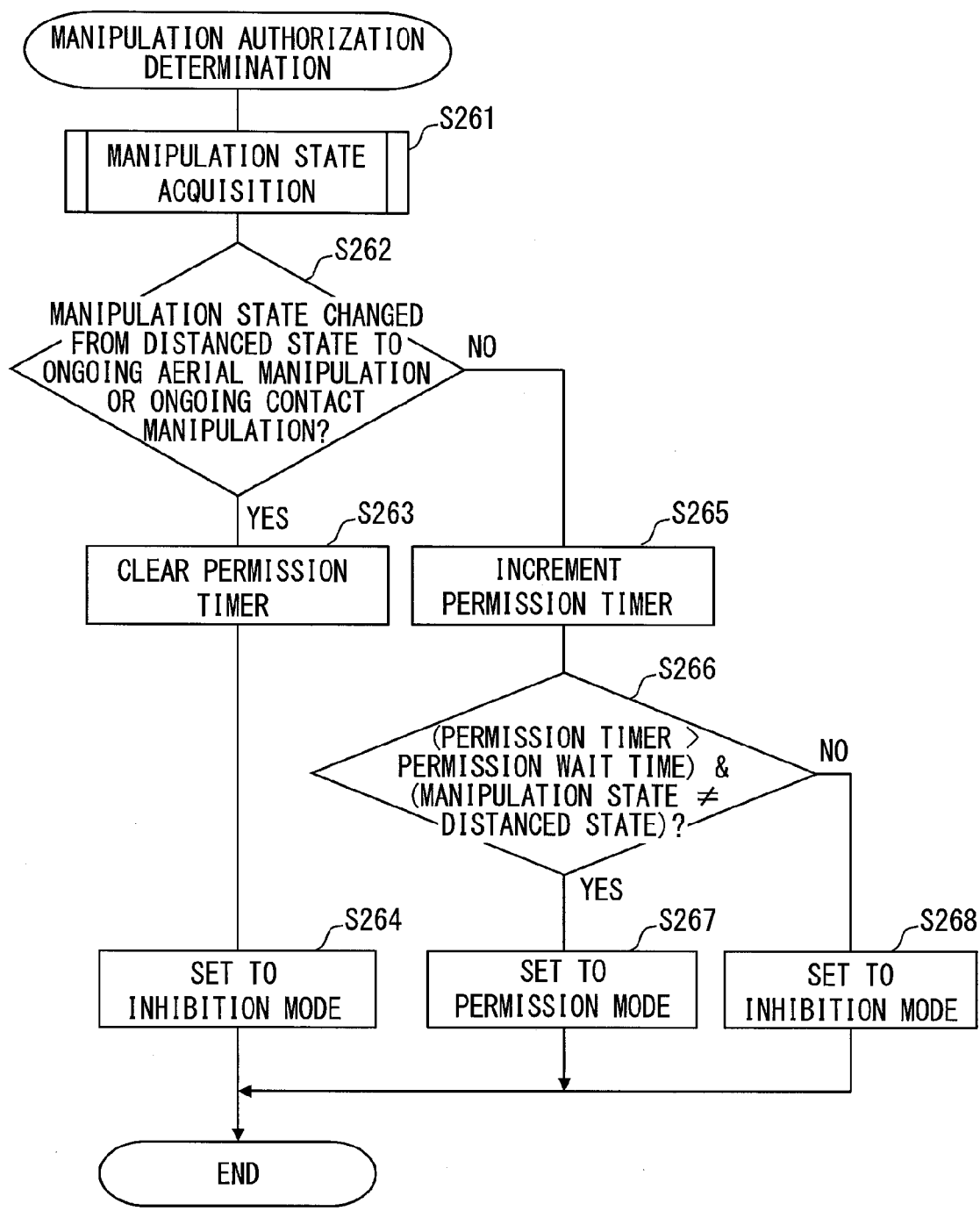
FIG. 19 is a flowchart illustrating a manipulation authorization determination process performed by the manipulation control circuit according to the second embodiment.
Figure 20:
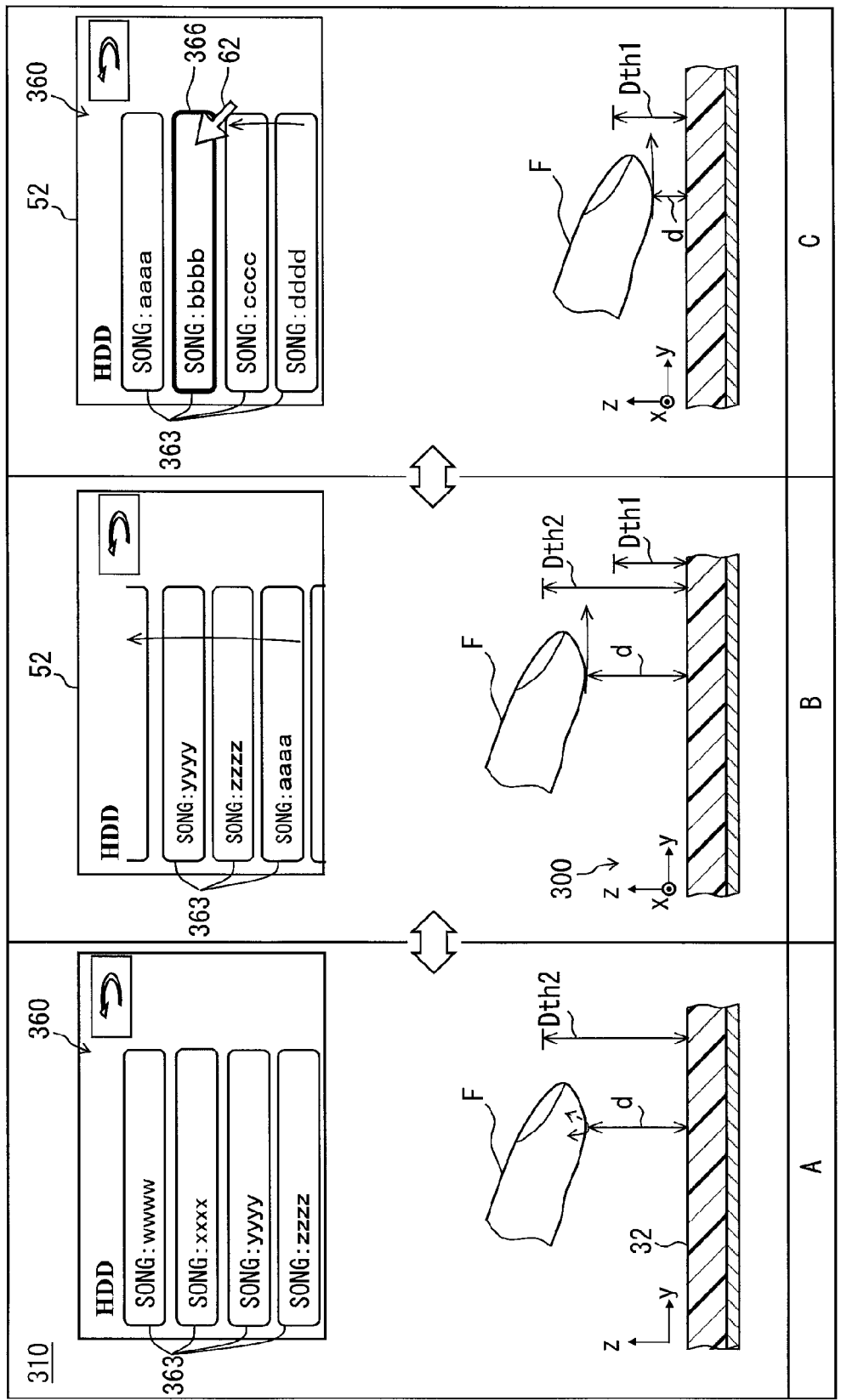
FIG. 20 illustrates how the remote manipulation apparatus according to a third embodiment changes an image portion associated with a finger movement according to a manipulation entity distance from the manipulation surface to a finger.

With reference to FIG. 19, the following describes in detail a manipulation authorization determination process performed at S242 described above.

At S261, the manipulation authorization determination process acquires the most recent manipulation state updated by the touch sensor input process (see FIG. 16) and then proceeds to S262. At S262, the manipulation authorization determination process determines whether or not the manipulation state acquired at S261 changes from the distanced state to one of the ongoing aerial manipulation and the ongoing contact manipulation. If the determination at S262 is affirmed, the manipulation authorization determination process proceeds to S263 and clears a permission timer to measure the permission wait time and thereby zeros a value of the timer. At S264, the manipulation authorization determination process sets the manipulation permission to the inhibition mode and then terminates.

If the determination at S262 is negated, the manipulation authorization determination process proceeds to S265. At S265, the manipulation authorization determination process increments the permission timer to increase the timer value and then proceeds to S266. At S266, the manipulation authorization determination process determines whether or not (i) the permission timer exceeds the permission wait time and simultaneously (ii) the manipulation state is not the distanced state. If the determination at S266 is affirmed, the manipulation authorization determination process proceeds to S267. At S267, the manipulation authorization determination process changes the manipulation authorization to the permission mode and then terminates. If the determination at S266 is negated, the manipulation authorization determination process proceeds to S268. At S268, the manipulation authorization determination process changes the manipulation authorization permission to the inhibition mode and then terminates.

The following describes how the above-mentioned manipulation authorization determination process changes the manipulation authorization from the inhibition mode to the permission mode as a result of the manipulation that continuously positions the finger to the aerial manipulation area or the contact manipulation area for the permission wait time or longer.

The determination at S262 is affirmed if finger F moves from the distant area to the aerial manipulation area (or the contact manipulation area) (e.g., see FIG. 15B). At S264, the manipulation authorization is set to the inhibition mode. If finger F is continuously positioned to the aerial manipulation area (or the contact manipulation area), the determination at S262 is negated and the manipulation authorization determination process repeatedly increments the permission timer. The negative determination at S266 remains valid until the permission timer count exceeds the permission wait time. The manipulation authorization remains the inhibition mode. The permission timer count exceeds the permission wait time if finger F is further continuously positioned to the aerial manipulation area (or the contact manipulation area). The determination at S266 is thereby affirmed. The manipulation authorization is changed to the permission mode.

The second embodiment described thus far interrupts the association between the aerial manipulation using finger F and the sub-menu control similarly to the first embodiment. Simply moving finger F to the manipulation surface 32 can be free from being associated with the sub-menu control against the manipulator's intention. Accordingly, the remote manipulation apparatus 200 according to the second embodiment can also provide excellent manipulability.

The second embodiment can maintain the inhibition mode according to the appropriately predetermined permission wait time while finger F simply passes through the aerial manipulation area. Therefore, moving finger F toward the manipulation surface 32 for the focus control can be further free from being associated with the sub-menu control against the manipulator's intention.

For instance, a vibration due to the vehicle traveling may hardly maintain manipulation entity distance d in a constant state. To that end, the second embodiment shortens first threshold distances Dth1U and Dth1D and lengthens second threshold distances Dth2U and Dth2D to expand the aerial manipulation area. Even if a vibration of the traveling vehicle might shake finger F, the manipulator can keep finger F for the ongoing aerial manipulation within the aerial manipulation area. This can facilitate the manipulation to move finger F within the aerial manipulation area. It is possible to further improve the manipulability regarding the sub-menu control.

In the second embodiment, the manipulation control circuit 33 further corresponds to a "traveling state determination section, device, or means." The focus 262 corresponds to a "first image portion" and a "pointer portion." The sub-menu 265 corresponds to a "second image portion" and a "non-pointer portion." The focus layer corresponds to a "first image layer." The sub-layer corresponds to a "second image layer." The focus control corresponds to a "first image control." The sub-menu control corresponds to a "second image control." The remote manipulation apparatus 200 corresponds to a "manipulation apparatus." While the second embodiment has described examples of these, the present disclosure is obviously not limited thereto.

(Third Embodiment)

A third embodiment of the present disclosure illustrated in FIGS. 20 through 24 is another modification of the first embodiment. A display image 360 illustrated in FIG. 20A is one of display images displayed by a display system 310 according to the third embodiment and represents an audio menu to manipulate an audio instrument mounted on the vehicle. As illustrated in FIG. 20C, the display image 360 contains track icons 363, a pointer 62, and a focus 366. The track icon 363 is associated with audio data. The pointer 62 selects the track icon 363. The focus 366 highlights the track icon 363.

FIG. 20C illustrates that manipulation entity distance d is shorter than first threshold distance Dth1. In this case, the contact manipulation moves finger F along the xy plane and is associated with the pointer control to manipulate the pointer 62. FIG. 20B illustrates that manipulation entity distance d exceeds first threshold distance Dth1 and is shorter than second threshold distance Dth2. In this case, the aerial manipulation moves finger F along the y-axis direction and is associated with the icon control to scroll a plurality of track icons 363.

Figures 21, 22:
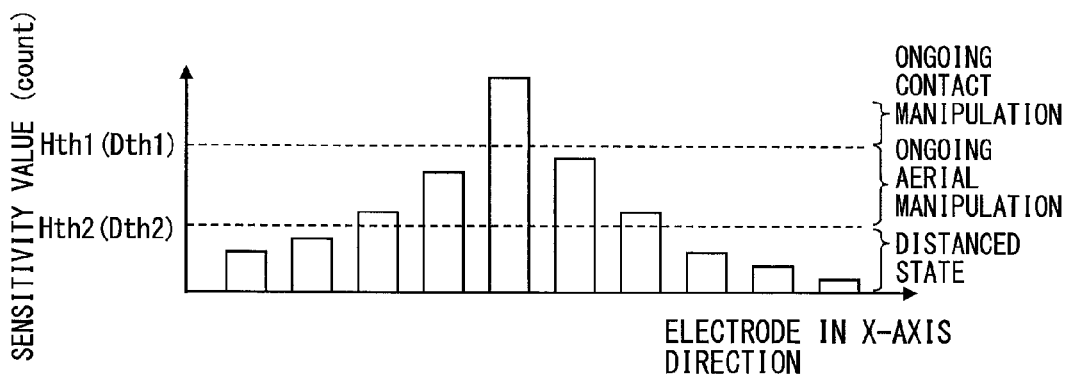
FIG. 21 illustrates relationship between a sensitivity value detected by the touch sensor and a manipulation state determined by the manipulation control circuit in the remote manipulation apparatus according to the third embodiment.
FIG. 22 illustrates first and second sensitivity threshold values stored in the manipulation control circuit according to the third embodiment.

As illustrated in FIGS. 21 and 22, the remote manipulation apparatus 300 according to the third embodiment omits dead zones provided for first and second threshold distances Dth1 and Dth2. In addition, the manipulation control circuit 33 (see FIG. 1) stores the authorization manipulation defined as the manipulation to move finger F along the manipulation surface 32 in one of the aerial manipulation area and the contact manipulation area as illustrated in FIG. 20A. Moreover, the authorization manipulation is obviously applicable to the manipulation to move finger F along the z-axis direction orthogonal to the manipulation surface 32 as well as the manipulation to move finger F along the xy plane.

The following describes a sequence of manipulator's manipulations to select any icon 363 according to the above-mentioned configuration.

FIG. 20A illustrates a state in which finger F is moved from the distant area to the aerial manipulation area so that manipulation entity distance d is shorter than second threshold distance Dth2. In the state illustrated in FIG. 20A, the manipulation authorization remains the inhibition mode. There is no association between the aerial manipulation to move finger F and the sub-menu control. The third embodiment stores the authorization manipulation defined as the manipulation to move finger F along the manipulation surface 32. As illustrated in FIG. 20B, the manipulation to position finger F to the aerial manipulation area along the xy plane changes the manipulation authorization from the inhibition mode to the permission mode. The aerial manipulation to move finger F is associated with the icon control. The manipulator can remotely scroll the track icon 363 according to the aerial manipulation to move finger F in the y-axis direction and thereby move any track icon 363 to the center of the display screen 52.

FIG. 20C illustrates a state in which finger F is moved from the aerial manipulation area to the contact manipulation area so that manipulation entity distance d is shorter than first threshold distance Dth1. In the state illustrated in FIG. 20C, the control associated with the manipulation to move finger F is changed from the icon control to the pointer control. The manipulator can thereby remotely manipulate the pointer 62 and the focus 366 according to the contact manipulation to move finger F along the xy plane. The manipulator can: allow the pointer 62 to overlap any track icon 363 moved to the center of the display screen 52 according to the aerial manipulation; press the push switch 35 (see FIG. 5); and select the track icon 363.

After finishing the manipulations illustrated in FIGS. 20B and 20C, the manipulator moves finger F away to a position where manipulation entity distance d exceeds second threshold distance Dth2. The manipulation authorization is thereby changed from the permission mode to the inhibition mode. The remote manipulation apparatus 300 then awaits the manipulator's subsequent manipulation to select an icon.

With reference to FIGS. 21 through 24, the following describes processes performed by the manipulation control circuit 33 (see FIG. 1) in order to implement the above-mentioned icon selection manipulation. The main process according to the third embodiment substantially equals the main process (see FIG. 8) according to the first embodiment. On the other hand, a touch sensor input process described below in detail omits the dead zones for the first and second threshold distances Dth1 and Dth1 and accordingly omits the hysteresis concerning the pointer control and the icon control.

Figure 23:
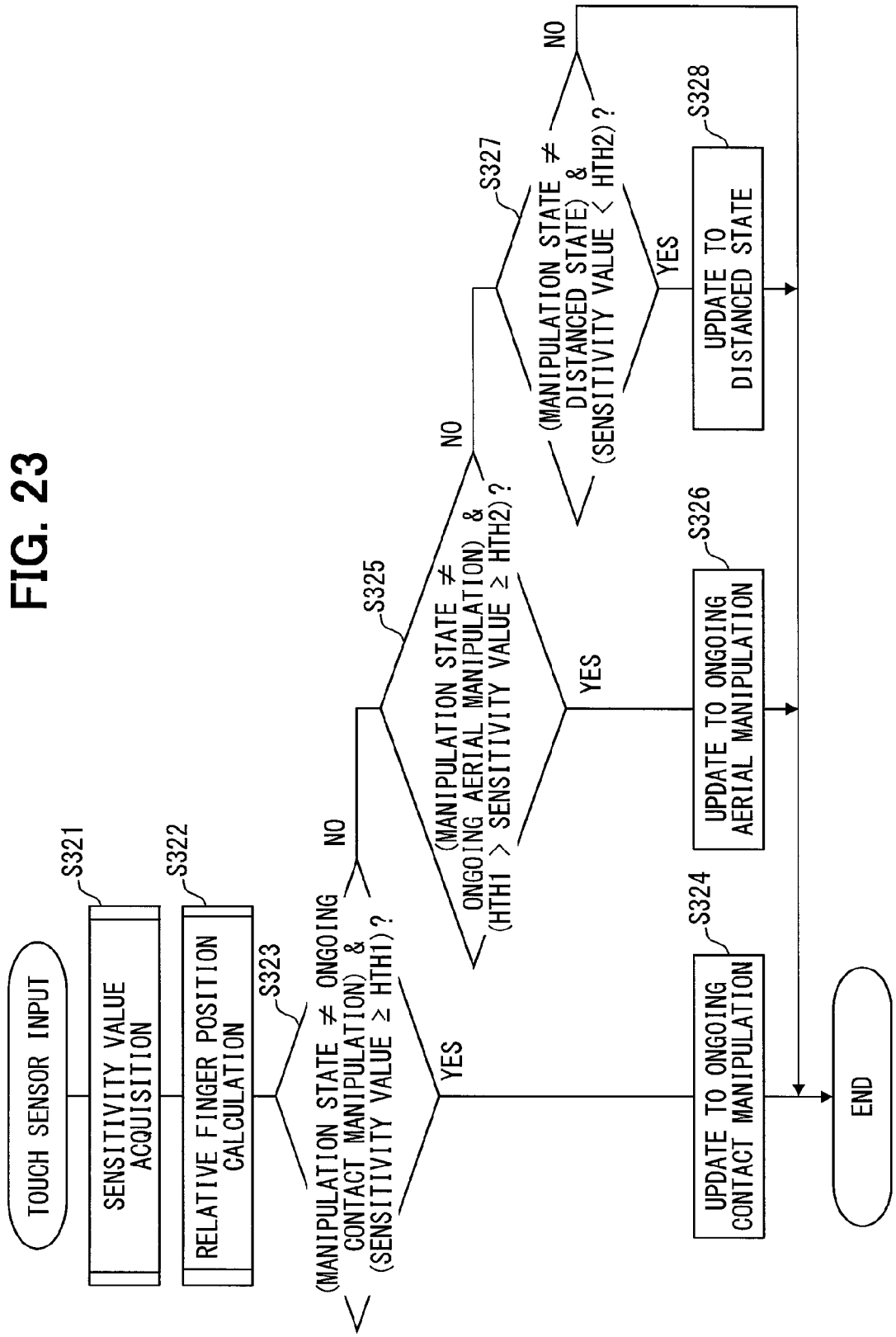
FIG. 23 is a flowchart illustrating a touch sensor input process performed by the manipulation control circuit according to the third embodiment.

S321 and S322 illustrated in FIG. 23 substantially equal S121 and S122 (see FIG. 9) according to the first embodiment. At S323, the touch sensor input process determines whether or not (i) the most recent manipulation state specified by the touch sensor input process differs from the ongoing contact manipulation and simultaneously (ii) the maximum sensitivity value acquired at S321 is greater than or equal to first sensitivity threshold value Hth1. If the determination at S323 is affirmed, the touch sensor input process proceeds to S324, updates the manipulation state to the ongoing contact manipulation, and then terminates.

If the determination at S323 is negated, the touch sensor input process proceeds to S325 and determines whether or not (i) the most recent manipulation state specified by the touch sensor input process differs from the ongoing aerial manipulation and simultaneously (ii) the maximum sensitivity value acquired at S321 is greater than or equal to second sensitivity threshold value Hth2 and is smaller than first sensitivity threshold value Hth1. If the determination at S325 is affirmed, the touch sensor input process proceeds to S326, updates the manipulation state to the ongoing aerial manipulation, and then terminates. If the determination at S325 is negated, the touch sensor input process proceeds to S327.

At S327, the touch sensor input process determines whether or not (i) the most recent manipulation state specified by the touch sensor input process differs from the distanced state and simultaneously (ii) the maximum sensitivity value acquired at S321 is smaller than second sensitivity threshold value Hth2. If the determination at S327 is affirmed, the touch sensor input process proceeds to S328, updates the manipulation state to the distanced state, and then terminates. If the determination at S327 is negated, the touch sensor input process terminates while maintaining the most recent manipulation state specified by the touch sensor input process.

A manipulation layer determination process according to the third embodiment substantially equals the manipulation layer determination process according to the first embodiment except S147 (see FIG. 12). The process according to the third embodiment corresponding to S147 (see FIG. 12) selects and updates an object layer to draw the track icon 363 as a selected layer.

Figure 24:
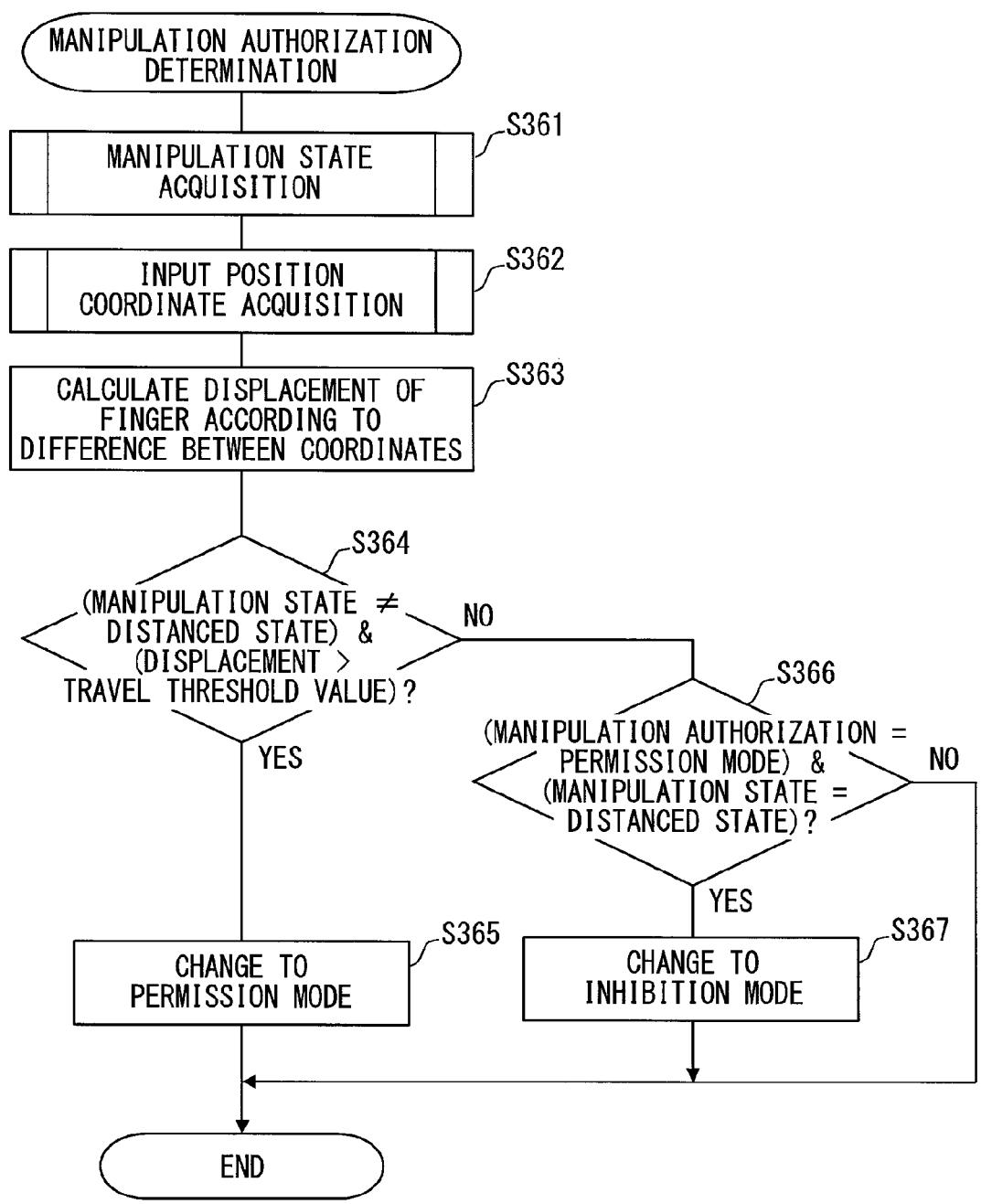
FIG. 24 is a flowchart illustrating a manipulation authorization determination process performed by the manipulation control circuit according to the third embodiment.

With reference to FIG. 24, the following describes in detail a manipulation authorization determination process performed at S142 of the manipulation layer determination process.

At S361, the manipulation authorization determination process acquires the most recent manipulation state updated by the touch sensor input process (see FIG. 23) and proceeds to S362. At S362, the manipulation authorization determination process acquires coordinates indicating the relative position of finger F calculated at S322 (see FIG. 23) of the touch sensor input process and proceeds to S363. At S363, the manipulation authorization determination process calculates the displacement of finger F according to a difference between the coordinates acquired by the previous manipulation authorization determination process and the coordinates acquired at S363 of the current manipulation authorization determination process and proceeds to S364.

At S364, the manipulation authorization determination process determines whether or not (i) the manipulation state acquired at S361 differs from the distanced state and simultaneously (ii) an accumulation of displacements in a direction parallel to the touch sensor within a predetermined time (e.g., one second) calculated at S363 exceeds a predetermined travel threshold value (e.g., 5 to 10 cm). Calculating an accumulation of displacements within a predetermined time enables to detect a so-called flick manipulation that quickly moves a finger on the touch panel. If the determination at S364 is affirmed, the manipulation authorization determination process proceeds to S365 and changes the manipulation authorization to the permission mode.

When the determination at S364 is negated, the manipulation authorization determination process proceeds to S366. At S366, the manipulation authorization determination process determines whether or not (i) the most recent manipulation authorization specified by the manipulation authorization determination process is permission mode and simultaneously (ii) the manipulation state acquired at S361 is the distanced state. If the determination at S366 is affirmed, the manipulation authorization determination process proceeds to S367 and changes the manipulation authorization to the inhibition mode. If the determination at S366 is negated, the manipulation authorization determination process terminates while maintaining the most recent manipulation authorization specified by the manipulation authorization determination process.

According to the third embodiment described thus far similarly to the first embodiment, simply moving finger F to the manipulation surface 32 can be free from being associated with the sub-menu control against the manipulator's intention. Accordingly, the remote manipulation apparatus 300 according to the third embodiment can also provide excellent manipulability.

According to the third embodiment, the manipulation to move finger F along any one of the xy plane and the z-axis direction may be defined as the authorization manipulation. In the third embodiment, the track icon 363 corresponds to a "second image portion," a "selected image portion," and a "non-pointer portion." The object layer corresponds to a "second image layer." The icon control corresponds to a "second image control." The remote manipulation apparatus 300 corresponds to a "manipulation apparatus." While the third embodiment has described examples of these, the present disclosure is obviously not limited thereto.

(Fourth Embodiment)

Figure 25:
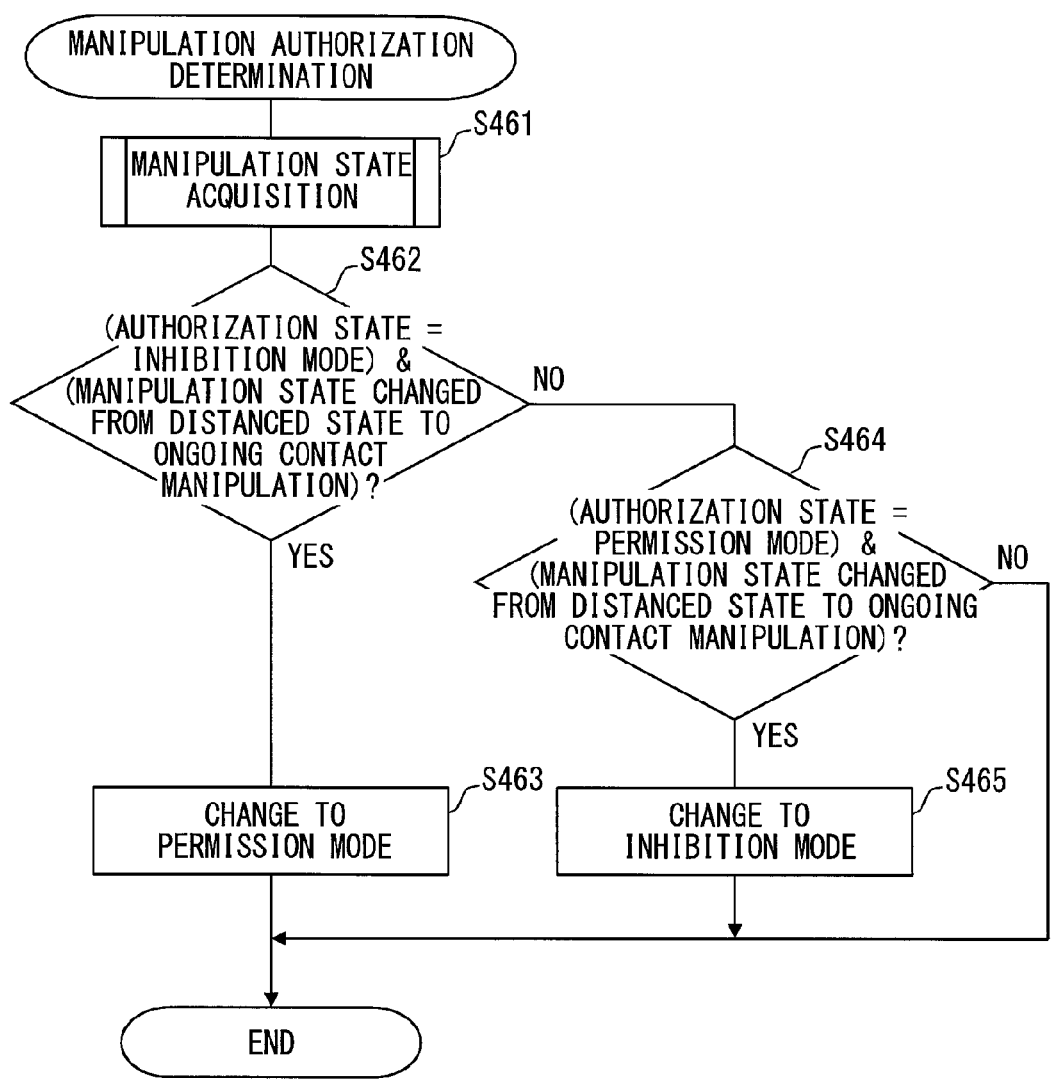
FIG. 25 is a flowchart illustrating a manipulation authorization determination process performed by the manipulation control circuit according to a fourth embodiment.

A fourth embodiment of the present disclosure is still another modification of the first embodiment. The manipulation control circuit 33 (see FIG. 1) according to the fourth embodiment stores an inhibition manipulation that substantially equals the authorization manipulation and allows finger F to approach the manipulation surface 32 to be shorter than first threshold distance Dth1, as illustrated in FIG. 6B. In the permission mode, the manipulation control circuit 33 changes the manipulation authorization from the permission mode to the inhibition mode when the inhibition manipulation is performed. With reference to FIG. 25, the following describes in detail a manipulation authorization determination process performed by the manipulation control circuit 33 according to the fourth embodiment.

At S461, the manipulation authorization determination process acquires the most recent manipulation state updated by the touch sensor input process (see FIG. 9). At S462, the manipulation authorization determination process determines whether or not (i) the most recent manipulation authorization specified by the manipulation authorization determination process is the inhibition mode and simultaneously (ii) the manipulation state acquired at S461 changes from the distanced state to the ongoing contact manipulation. When the determination at S462 is affirmed, the manipulation authorization determination process proceeds to S463. Since the manipulation state changes from the distanced state to the ongoing contact manipulation, the manipulation authorization determination process changes the manipulation authorization from the inhibition mode to the permission mode and then terminates. As a result, as described above, the aerial manipulation in FIG. 6C is permitted from the contact manipulation in FIG. 6B.

If the determination at S462 is negated, the manipulation authorization determination process proceeds to S464. At S464, the manipulation authorization determination process determines whether or not (i) the most recent manipulation authorization specified by the manipulation authorization determination process is the permission mode and simultaneously (ii) the manipulation state acquired at S461 changes from the distanced state to the ongoing contact manipulation. In other words, the process at S464 determines whether or not the manipulator performs the manipulation to move finger F from the distant area, the aerial manipulation area, and then to the contact manipulation area as illustrated in FIGS. 7A through 7C under the permission mode permitting the aerial manipulation.

If the determination at S464 in FIG. 25 is affirmed, the manipulation authorization determination process proceeds to S465. At S465, the manipulation authorization determination process changes the manipulation authorization from the permission mode to the inhibition mode and then terminates. If the determination at S464 is negated, the manipulation authorization determination process terminates while maintaining the most recent manipulation authorization specified by the manipulation authorization determination process.

The fourth embodiment described thus far provides the effect comparable to the first embodiment. Therefore, the remote manipulation apparatus can also provide excellent manipulability. Further, according to the fourth embodiment, the inhibition manipulation changes the permission mode to the inhibition mode and thereby interrupts the association between the manipulation using finger F and the map control as illustrated in FIG. 6C. Therefore, the manipulation is hardly associated with the map control in FIG. 6C even if finger F is positioned to the aerial area as illustrated in FIG. 6C before finger F is allowed to touch the manipulation surface 32 in order to perform the pointer control as illustrated in FIG. 6B. The manipulation can be free from being associated with the map control against the manipulator's intention even if finger F leaves the manipulation surface 32 and subsequently enters the aerial manipulation area in FIG. 6C after completion of the pointer control using finger F that is allowed to touch the manipulation surface 32 as illustrated in FIG. 6B.

The above-mentioned feature can reduce the manipulator's inadvertent movement of the map 64 in the case of stopping the pointer control as well as starting the same. Accordingly, the manipulability of the remote manipulation apparatus is further improved. According to the fourth embodiment, the manipulation control circuit 33 further corresponds to an "inhibition manipulation determination section, device, or means."

(Fifth Embodiment)

Figure 26:
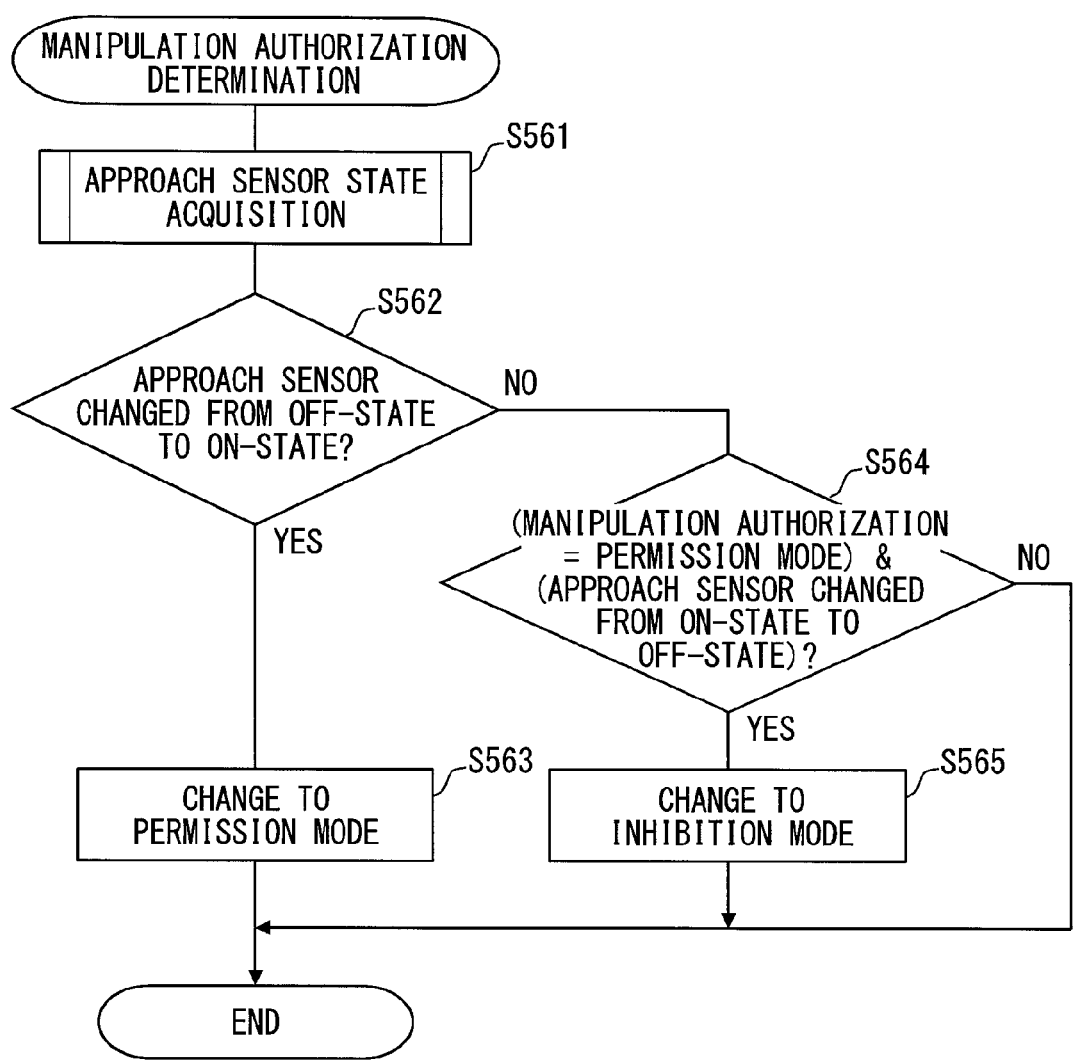
FIG. 26 is a flowchart illustrating a manipulation authorization determination process performed by the manipulation control circuit according to a fifth embodiment.

A fifth embodiment of the present disclosure is yet another modification of the first embodiment. The manipulation control circuit 33 (see FIG. 1) according to the fifth embodiment connects with an approach sensor 538 illustrated in FIG. 2. The approach sensor 538 is placed at the periphery of the palm rest 39 so as to face the manipulator's palm. The approach sensor 538 changes from the off-state to the on-state when the manipulator's palm approaches the approach sensor 538 to become shorter than a predetermined approach distance. The manipulation control circuit 33 stores the authorization manipulation defined as the manipulation to allow the palm to approach the sensor 538 until the approach sensor 538 turns on. When the approach sensor 538 turns on, the manipulation control circuit 33 enables the permission mode that permits acceptance of the aerial manipulation. When the approach sensor 538 turns off, the manipulation control circuit 33 enables the inhibition mode that inhibits acceptance of the aerial manipulation. With reference to FIG. 26, the following describes in detail a manipulation authorization determination process performed by the manipulation control circuit 33 in a configuration that allows manipulation to the approach sensor 538 to enable changeover of the manipulation authorization.

At S561, the manipulation authorization determination process acquires the on-state and the off-state of the approach sensor 538 and proceeds to S562. At S562, the manipulation authorization determination process determines, based on the state of the approach sensor 538 acquired at S561, whether or not the off-state changes to the on-state. If the determination at S562 is affirmed, the manipulation authorization determination process proceeds to S563. At S563, the manipulation authorization determination process changes the manipulation authorization from the inhibition mode to the permission mode and then terminates.

If the determination at S562 is negated, the manipulation authorization determination process proceeds to S564. At S564, the manipulation authorization determination process determines whether or not (i) the most recent manipulation authorization specified by the manipulation authorization determination process is the permission mode and simultaneously (ii) the state of the approach sensor 538 acquired at S561 changes from the on-state to the off-state. If the determination at S564 is affirmed, the manipulation authorization determination process proceeds to S565. At S565, the manipulation authorization determination process changes the manipulation authorization from the permission mode to the inhibition mode and then terminates. If the determination at S564 is negated, the manipulation authorization determination process terminates while maintaining the most recent manipulation authorization specified by the manipulation authorization determination process.

According to the fourth embodiment described thus far, the manipulation authorization of the manipulation control circuit 33 remains the inhibition mode until the authorization manipulation to the approach sensor 538 is performed to the manipulation surface 32. When the acceptance of the aerial manipulation using finger F is interrupted, moving finger F to the manipulation surface 32 can be free from being associated with the map control against the manipulator's intention.

On the other hand, the authorization manipulation on the approach sensor 538 changes the manipulation authorization from the inhibition mode to the permission mode. When the acceptance of the aerial manipulation starts, the manipulator can select one of an image portion associated with the aerial manipulation and an image portion associated with the contact manipulation and manipulate the selected one while maintaining the manipulation using finger F to the manipulation surface 32. As described above, the manipulation apparatus according to the fifth embodiment capable of the effect comparable to the first embodiment can also provide excellent manipulability.

(Sixth Embodiment)

Figure 27:
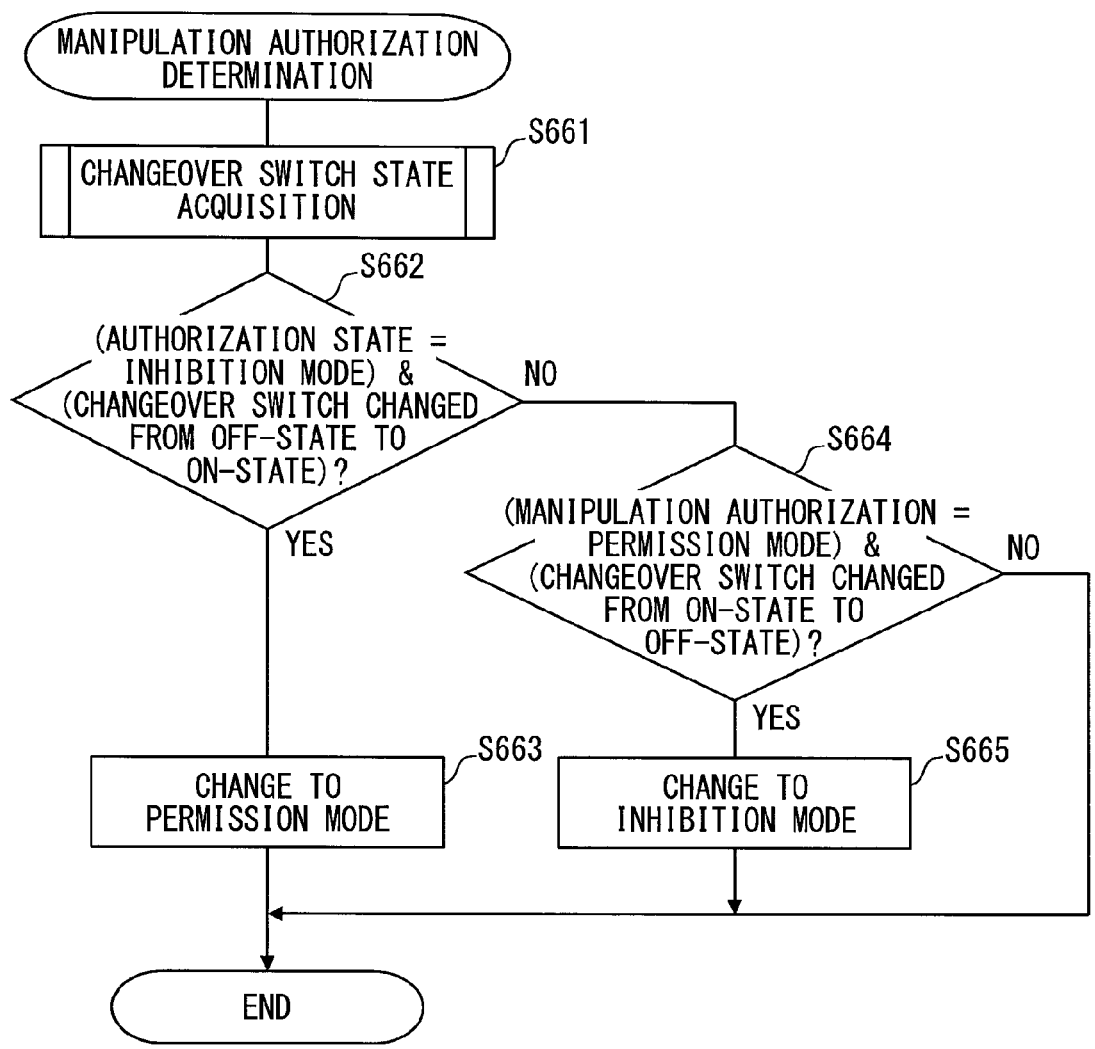
FIG. 27 is a flowchart illustrating a manipulation authorization determination process performed by the manipulation control circuit according to a sixth embodiment.

A sixth embodiment of the present embodiment is a modification of the fourth embodiment. The manipulation control circuit 33 (see FIG. 1) according to the sixth embodiment connects with a changeover switch (unshown). The changeover switch is placed near the manipulation surface 32 to enable manipulation of a finger different from finger F to manipulate the manipulation surface 32 as illustrated in FIG. 20A. The manipulator's press manipulation turns on or off the changeover switch. The manipulation control circuit 33 stores the authorization manipulation defined as the manipulation to turn on the changeover switch. With reference to FIG. 27, the following describes in detail a manipulation authorization determination process performed by the manipulation control circuit 33 in a configuration that allows manipulation on the changeover switch to enable changeover of the manipulation authorization.

At S661, the manipulation authorization determination process acquires the on-state and the off-state of the changeover switch and proceeds to S662. At S662, the manipulation authorization determination process determines whether or not (i) the most recent manipulation authorization specified by the manipulation authorization determination process is the inhibition mode and simultaneously (ii) the changeover switch state acquired at S661 changes from the off-state to the on-state. If the determination at S662 is affirmed, the manipulation authorization determination process proceeds to S663, changes the manipulation authorization from the inhibition mode to the permission mode, and then terminates.

If the determination at S662 is negated, the manipulation authorization determination process proceeds to S664. At S664, the manipulation authorization determination process determines whether or not (i) the most recent manipulation authorization specified by the manipulation authorization determination process is the permission mode and simultaneously (ii) the changeover switch state acquired at S661 changes from the on-state to the off-state. If the determination at S664 is affirmed, the manipulation authorization determination process proceeds to S665. At S665, the manipulation authorization determination process changes the manipulation authorization from the permission mode to the inhibition mode and then terminates. If the determination at S664 is negated, the manipulation authorization determination process terminates while maintaining the most recent manipulation authorization specified by the manipulation authorization determination process.

As described above, the sixth embodiment defines manipulation on the changeover switch as the authorization manipulation and also provides the effect comparable to the first embodiment. The remote manipulation apparatus can provide excellent manipulability. The changeover switch may be provided as a mechanical structure or a resistive touch panel.

(Seventh Embodiment)

Figure 28:
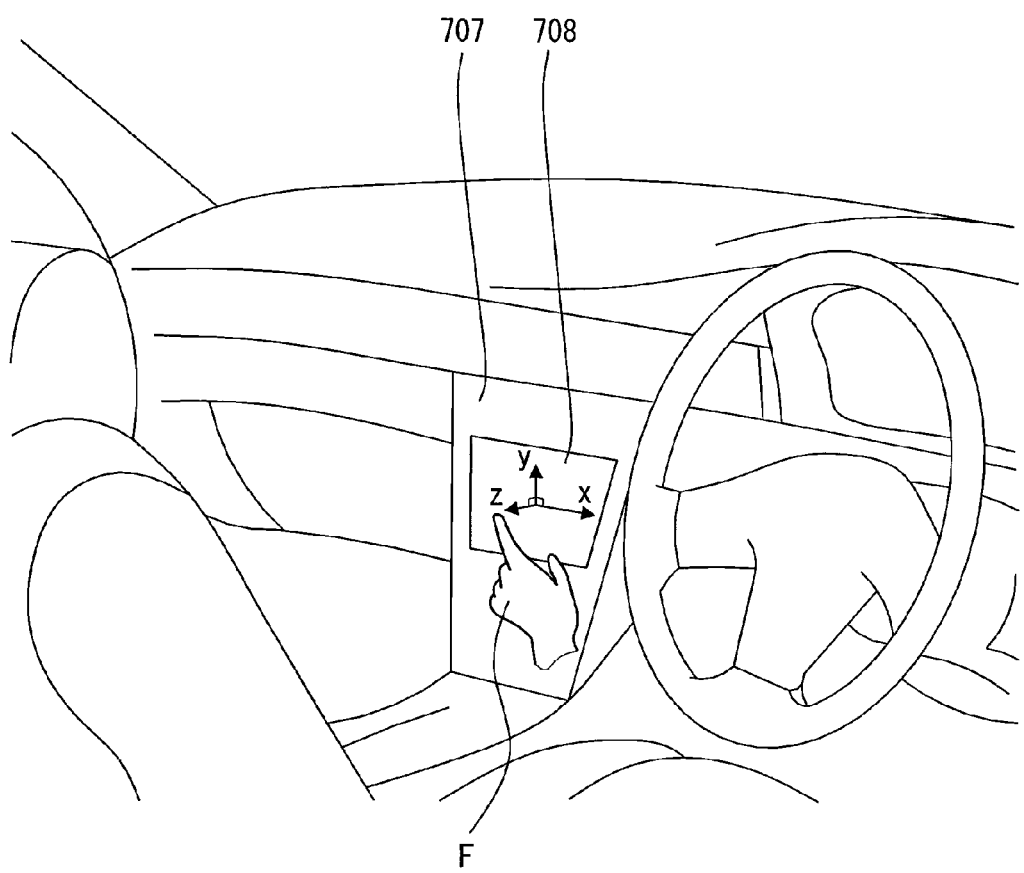
FIG. 28 is a perspective view illustrating a vehicular center console according to a seventh embodiment.
Figure 29:
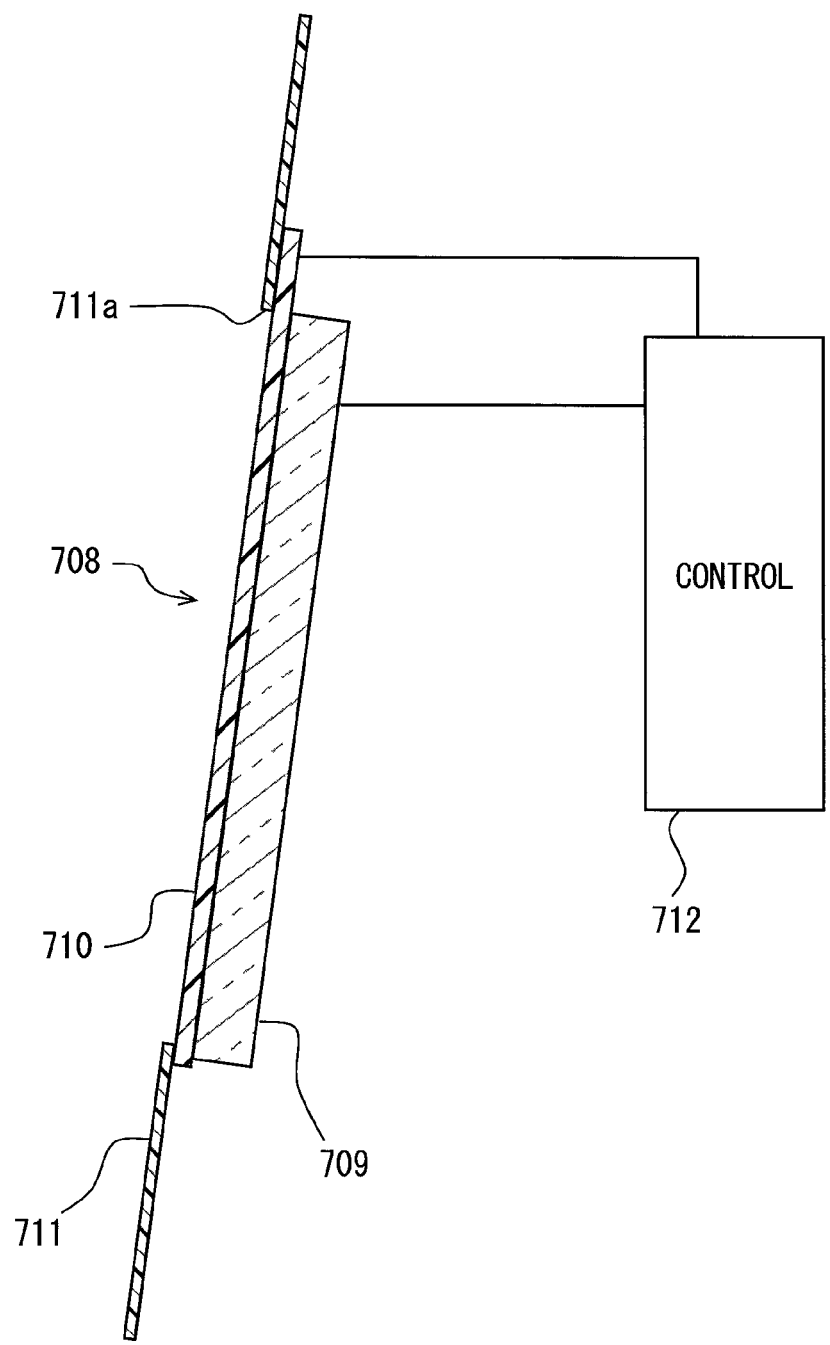
FIG. 29 is a sectional view of the center console according to the seventh embodiment.

The above-mentioned first through sixth embodiments have described examples of applying the present disclosure to the remote manipulation apparatus used for the display system mounted on the vehicle. However, as will be described in a seventh embodiment below, the disclosure is also applicable to a so-called touch-panel manipulation apparatus integrated with a display screen. With reference to FIGS. 28 through 34, the following describes the seventh embodiment of the present disclosure. FIG. 28 is a perspective view illustrating a center console 707 of the vehicle. The center console 707 is provided with a touch display panel 708. FIG. 29 is a cross sectional view of the center console 707 in FIG. 28. The touch display panel 708 according to the present embodiment illustrated in FIGS. 28 and 29 includes a touch sensor 710 as the manipulation surface attached to an LCD 709 as the display portion. The LCD 709 and the touch sensor 710 are fit into an aperture 711a of a design panel 711 on the center console 707.

The touch sensor 710 includes a transparent electrode made of indium oxide, for example. A vehicle occupant moves manipulation entity F such as his or her hand to the touch sensor 710 while visually confirming a display image on the LCD 709 at the rear of the touch sensor 710 across the touch sensor 710.

Figure 30:
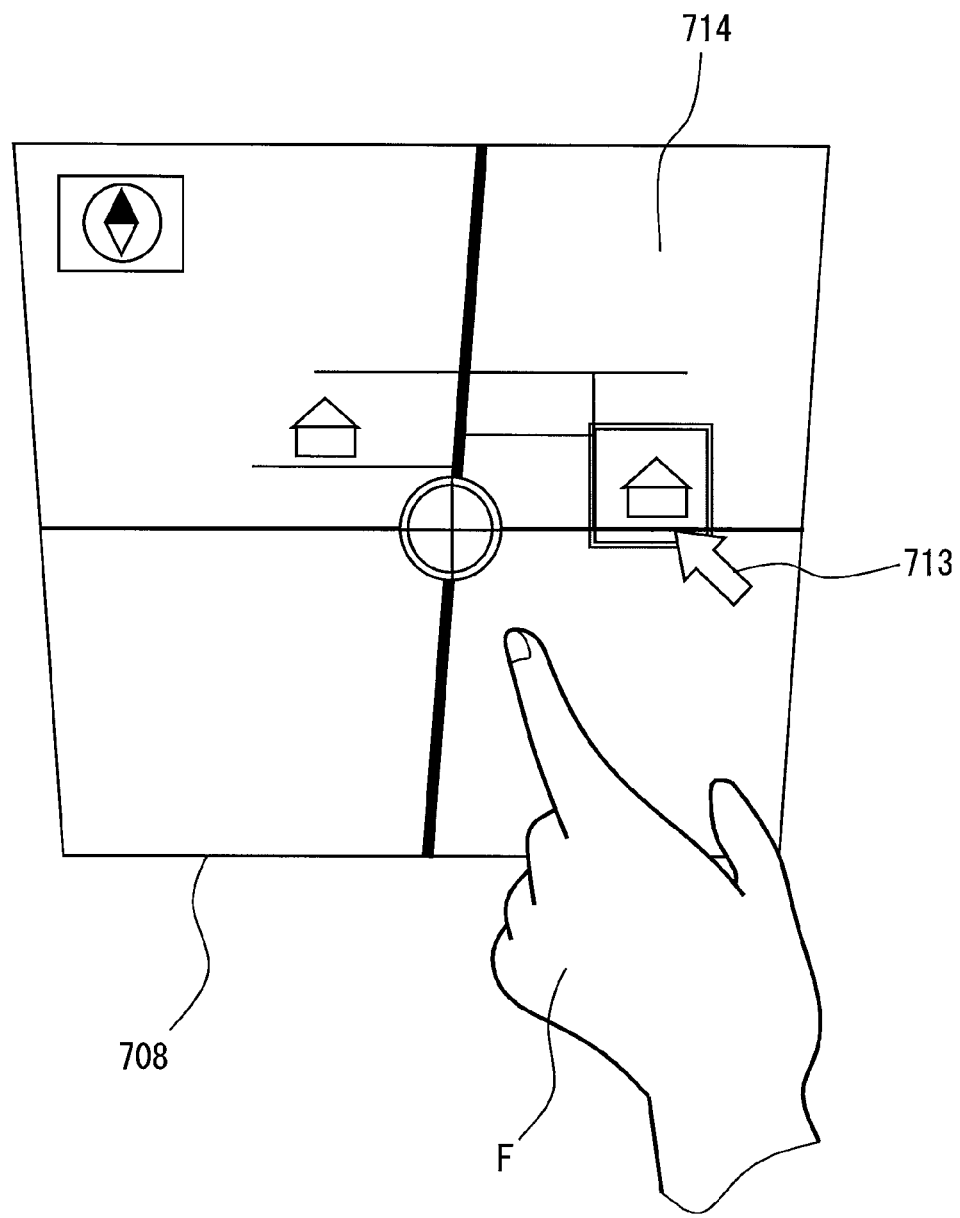
FIG. 30 illustrates example images displayed on an LCD provided for the center console according to the seventh embodiment and a manipulation entity to manipulate the LCD.

The touch sensor 710 and the LCD 709 are connected to a control circuit 712. Input to the touch sensor 710 allows the control circuit 712 to change a display mode of the image portion displayed on the LCD 709. More specifically, the control circuit 712 detects movement of manipulation entity F such as a finger approaching the touch sensor 710. From the touch sensor 710, the control circuit 712 acquires a distance measurement value that increases or decreases according to distance d (see FIG. 32) between the touch sensor 710 and manipulation entity F. As illustrated in FIG. 30, the LCD 709 displays a plurality of images overlapping with each other.

Figure 31:
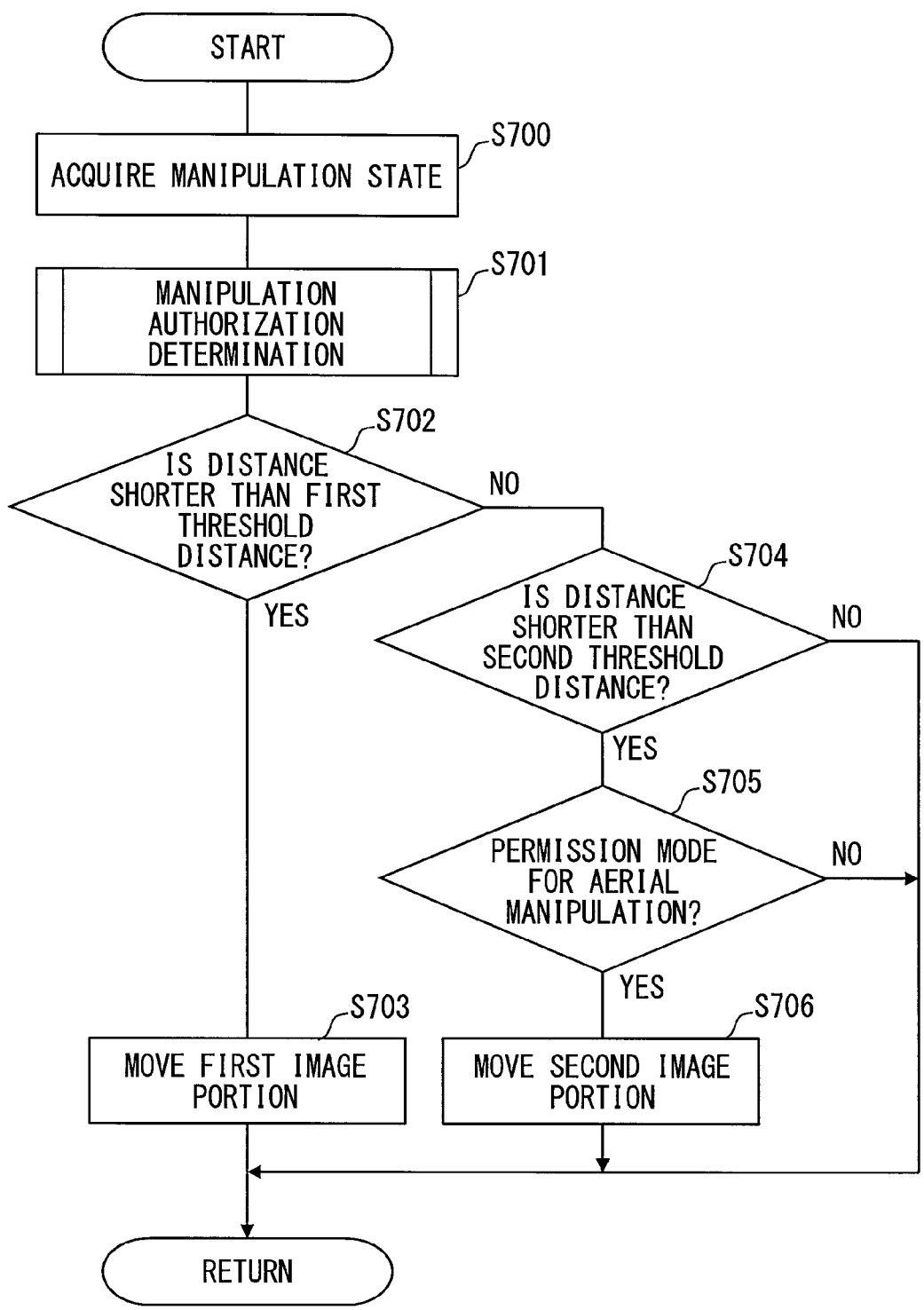
FIG. 31 is a flowchart illustrating the contents of determination performed by a control circuit according to the seventh embodiment.

FIG. 31 is a flowchart illustrating the contents of determination performed by the control circuit 712 according to the present embodiment. At S700, the control circuit 712 reads various types of information from the touch sensor 710 connected to the control circuit 712 and other instruments. At S701, the control circuit 712 determines whether a condition for one of the inhibition mode and the permission mode is available as will be described later. If a condition for one of the modes is available, the control circuit 712 activates the corresponding mode and proceeds to S702.

At S701, the control circuit 712 determines whether the manipulation performed by the manipulation entity includes a predetermined authorization manipulation. If it is determined at S701 that a predetermined authorization manipulation is included, the control circuit 712 inactivates the inhibition mode and activates the permission mode. The condition to enable the inhibition mode or the permission mode (authorization manipulation) may be appropriately selected from the conditions described in the first through sixth embodiments.

Figure 34:
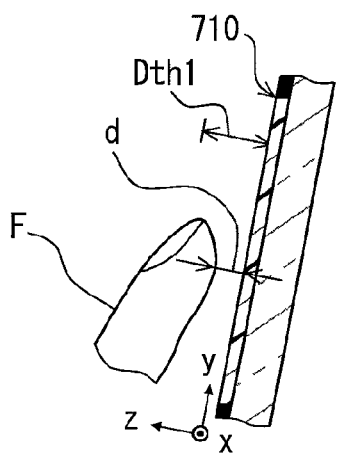
FIG. 34 illustrates that a distance between the manipulation entity and the touch sensor is shorter than the first threshold distance with reference to the sectional view of the center console according to the seventh embodiment.

At S702, the control circuit 712 determines whether distance d between the manipulation surface (the touch sensor 710 according to the present embodiment) and manipulation entity F is shorter than first threshold distance Dth1 (see FIG. 34). It may be determined that distance d between the manipulation surface and manipulation entity F is shorter than first threshold distance Dth1. In this case, the control circuit 712 proceeds to S703 and changes the display mode of a first image portion of the image portions based on the movement of manipulation entity F. Specifically, suppose a case where finger F illustrated in FIG. 34 is positioned within first threshold distance Dth1 (specified distance) from the touch sensor 710 and touches or is about to touch the touch sensor 710. In such a case, the present embodiment vertically or horizontally moves a cursor image 713 illustrated in FIG. 30 based on the movement of finger F. The touch sensor 710 as a manipulation portion according to the present embodiment can sense a pressure when manipulation entity F touches or presses the surface of the touch sensor 710. In addition, pressing the surface of the touch sensor 710 using manipulation entity F is assumed to be a determination input manipulation at a point overlapping with the cursor image 713. Instead of pressing, double tapping may activate the determination input manipulation, for example. As described in the first through sixth embodiments, a push switch for the determination input manipulation may be provided for the center console 707 independently of the touch display panel.

Figure 32:
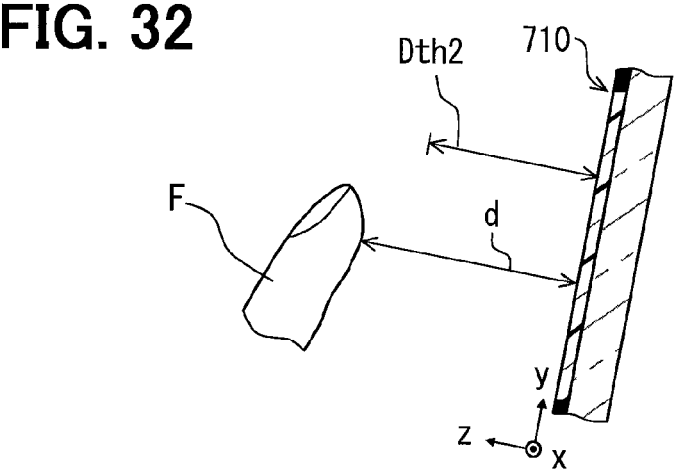
FIG. 32 illustrates that a distance between a manipulation entity and a touch sensor is longer than a second threshold distance with reference to the sectional view of the center console according to the seventh embodiment.
Figure 33:
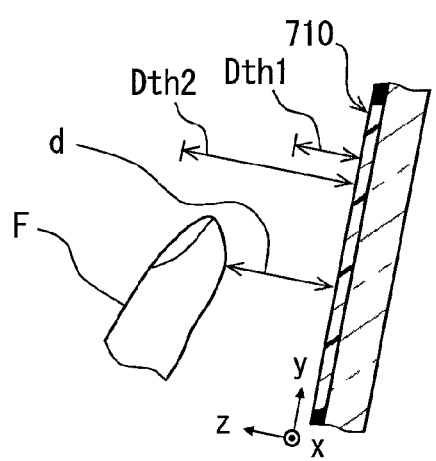
FIG. 33 illustrates that a distance between the manipulation entity and the touch sensor is shorter than the second threshold distance and is longer than a first threshold distance with reference to the sectional view of the center console according to the seventh embodiment.

At S701 in FIG. 31, it may be determined that distance d between the manipulation surface and manipulation entity F is longer than or equal to first threshold distance Dth1. In this case, the control circuit 712 proceeds to S704 and determines whether the distance between the manipulation portion and manipulation entity F is shorter than second threshold distance Dth2. It may be determined that the distance between the manipulation portion and manipulation entity F is shorter than second threshold distance Dth2. In this case, the control circuit 712 proceeds to S705 and determines whether the permission mode is identified at S701. If the permission mode is identified, the control circuit 712 proceeds to S706 and changes the display mode for a second image portion different from the first image portion out of the image portions. Specifically, FIG. 33 illustrates that the finger is positioned within the specified range from the touch sensor 710, namely, positioned to be shorter than second threshold distance Dth2 and longer than first threshold distance Dth1. In this case, the present embodiment vertically and horizontally slides a map image 714 overlapped with the cursor image 713 based on the finger movement to vary the range displayed on the LCD 709. At S705, it may be determined that the inhibition mode is identified. In this case, the control circuit 712 returns to S700 and repeats the process without changing the display mode for the second image in response to the input manipulation using manipulation entity F. At S704, as illustrated in FIG. 32, it may be determined that the finger is positioned outside the specified range, namely, manipulation entity F is distanced from the touch sensor 710 to be longer than second threshold distance Dth2. Also in this case, the control circuit 712 returns to S700 and repeats the process without changing the display mode for the second image in response to the input manipulation using manipulation entity F.

The inhibition mode may be referred to as a first mode that reflects none of input manipulation using manipulation entity F on the display mode for the image portion displayed on the LCD 709 if the distance between the manipulation portion and manipulation entity F exceeds first threshold distance Dth1. The permission mode may be referred to as a second mode that reflects input manipulation using manipulation entity F on the display mode for the image portion even if the distance between the manipulation portion and manipulation entity F exceeds first threshold distance Dth1.

The inhibition mode and the permission mode may be defined according to a method of changing the display mode based on whether manipulation entity F is distanced from the manipulation portion as long as a specified distance in the z direction regardless of threshold distances Dth1 and Dth2 as parameters used by the control circuit 712 for determination. Specifically, the inhibition mode may be referred to as a first mode that does not vary a method of changing the display mode for the image portion displayed on the LCD 709 depending on whether distance d between the manipulation portion and manipulation entity F exceeds a specified distance. The permission mode may be referred to as a second mode that varies a method of changing the display mode for the image portion depending on whether distance d between the manipulation portion and manipulation entity F exceeds a specified distance.

When the first and second modes are defined as described above, the control circuit 712 may be referred to as a switchover portion that determines the presence or absence of a permission manipulation and switches between the inhibition mode and the permission mode.

While the seventh embodiment has described the cursor image 713 and the map image 714 as examples of image portions displayed on the LCD 709, the present disclosure is obviously not limited thereto. It may be favorable to change the display mode for images such as detailed window images for sub-menus and setup buttons in the sub-menu described in the second embodiment depending on a distance between the manipulation portion and the manipulation entity.

While the above-mentioned embodiments use the capacitance-type touch sensor as a manipulation portion, the present disclosure is not limited thereto. Various manipulation portions may be used if the aerial manipulation and the contact manipulation can be detected. For example, it may be favorable to use an infrared camera or a visible-light camera to capture the manipulator's hand and estimate a shape of the manipulator's hand on the manipulation panel or a distance between the manipulation panel and the manipulator's hand based on the captured image.

According to the above-mentioned embodiments, input to the touch sensor performs the authorization manipulation and improves convenience compared to a case of providing an authorization manipulation button in addition. This is because the manipulator can perform the authorization manipulation and then the aerial manipulation uninterruptedly.

(Other Embodiments)

While there have been described embodiments of the present disclosure, the present disclosure should not be understood exclusively in terms of the above-mentioned embodiments but may be applicable to various embodiments and combinations within the spirit and scope of the disclosure.

According to the above-mentioned embodiments, the capacitance-type touch sensor 31 and the manipulation control circuit 33 cooperate with each other to provide functions of the "acquisition section, device, or means" in addition to the "detection section, device, or means." The capacitance-type touch sensor 31 can detect movement of finger F not only in the x-axis and y-axis directions along the manipulation surface 32, but also in the z-axis direction substantially orthogonal to the manipulation surface 32. Therefore, the touch sensor 31 appropriately distinguishes between the approaching state of finger F during the ongoing aerial manipulation onto the manipulation surface 32 and the contacting state of finger F during the ongoing contact manipulation onto the manipulation surface 32.

The above-mentioned embodiments use manipulation entity distance d and z coordinates as values to represent a relative position of finger F with reference to the manipulation surface 32. Manipulation entity distance d and z coordinates to represent a distance between the manipulation surface 32 and finger F are substantially equivalent to each other and have a correlation with sensitivity values detected by the touch sensor 31.

The configuration of the "acquisition section, device, or means" may be varied as needed and is not limited to the capacitance-type touch sensor capable of detecting input position coordinates in the three-dimensional directions on/over the surface of the touch sensor 31. For example, it may be favorable to configure the "acquisition section, device, or means" that analyzes an image and thereby acquires the manipulation entity distance (or the z coordinates) by connecting the manipulation control circuit with a camera to capture vicinities of the manipulation surface. Alternatively, it may be favorable to configure the "acquisition section, device, or means" by connecting the manipulation control circuit with an infrared sensor capable of measuring the manipulation entity distance using the infrared light. The infrared sensor and the manipulation control circuit may cooperate with each other to function as the "acquisition section, device, or means" and the "detection section, device, or means" to detect manipulation using finger F. A pressure-sensitive touch sensor to detect manipulation using finger F detects a pressure applied by finger F and may be used as the "detection section, device, or means."

As described above, the "contact manipulation" defines the state of finger F in direct contact with the manipulation surface 32 of the touch sensor 31 and further defines the state of finger F floating as long as first threshold distance Dth1 (e.g., approximately 0.5 to 1 cm) over the manipulation surface 32. Obviously, the "contact manipulation" may define only the state of finger F in direct contact with the manipulation surface 32 of the touch sensor 31.

The display images 60, 260, and 360 described in the first through third embodiments are examples of the display image and may be changed as needed. According to the above-mentioned embodiments, the pointer 62 and the focus 262 correspond to the "pointer portion." The map 64, the sub-menu 265, and the track icon 363 correspond to the "non-pointer portion." However, image portions corresponding to the "pointer portion" and the "non-pointer portion" may be changed as needed. In particular, an image portion corresponding to the "pointer portion" is not limited to the pointer or the focus only if the image portion can indicate the position corresponding to the current manipulation position on the display screen.

For example, the "pointer portion" may function by changing the display mode for one of several "selected image portions" displayed on the display screen when the "selected image portion" is available at a position corresponding to the manipulation position. Specifically, a track icon corresponding to the "non-pointer portion" may function as the "pointer portion" if a plurality of track icons are displayed as described in the third embodiment. In more detail, one track icon corresponds to the current manipulation position on the display screen and varies the display mode by way of change to a more attractive display color or enlargement. The track icons can thereby indicate positions corresponding to the current manipulation positions on the display screen. A method of varying the display mode includes vertically and horizontally vibrating a track icon or allowing it to blink on the display screen, for example. Further, the current manipulation position may be indicated by using a less attractive display color for the other track icons than the one corresponding to the current manipulation position on the display screen.

The second embodiment determines the traveling state based on whether a traveling speed exceeds 10 km/h. However, a speed threshold value to determine the traveling state may be changed as needed. The speed threshold value may be 5 km/h or 0 km/h, for example. The speed threshold value may be larger than 10 km/h. The speed threshold value may be provided with a hysteresis to suppress a frequent change between "traveling" and "stopped."

The sixth embodiment inhibits or permits the manipulation authorization based on the on/off-state of the changeover switch. For example, another capacitance-type touch sensor may be additionally provided for one side of the touch sensor 31. The manipulation authorization may be inhibited or permitted when a finger directly touches the additional touch sensor or moves over the additional touch sensor in the z-axis direction.

While the above-mentioned embodiments have described various types of "authorization manipulation," the "authorization manipulation" is not limited thereto. For example, the authorization manipulation may denote a manipulation to move several fingers F inside one of the contact manipulation area and the aerial manipulation area. Alternatively, the authorization manipulation may denote a manipulation to draw a specific picture inside the contact manipulation area and the aerial manipulation area. Further, a plurality of manipulations may be stored as the authorization manipulation. It may be also favorable to capture finger F corresponding to the "authorization manipulation" using a camera and inhibit or permit the manipulation authorization based on the camera image.

According to the above-mentioned embodiments, the liquid crystal display 51 represents the "display screen." However, the "display screen" may denote a display device using a plasma display panel or an organic EL display. Further, a windshield and a combiner provided for an instrument panel may be used as the "display screen," for example. The display system may include a display apparatus that uses a projection portion, device, or means such as a projector to project images onto the windshield and the combiner.

According to the above-mentioned embodiments, the manipulation control circuit 33 performs: the process to determine whether the authorization manipulation is performed; and the process to switch between the permission mode and the inhibition mode. When the movement of finger F changes input position coordinates, the manipulation control circuit 33 allows the display control circuit 53 to change an image portion to be controlled based on whether first sensitivity threshold value Hth1 is sandwiched between the z-axis coordinates for two points before and after the change. In other words, the manipulation control circuit 33 allows the display control circuit 53 to transmit a display image to the liquid crystal display 51. In more detail, a display image containing the first image portion is transmitted when the contact manipulation is detected. A display image containing the second image portion is transmitted when the aerial manipulation is detected. The manipulation control circuit 33 functions as an "authorization manipulation determination section, device, or means," a "mode changeover section, device, or means," an "image portion changeover section, device, or means," and a "transmission control section, device, or means." The manipulation control circuit 33 may be configured as a single circuit or apparatus such as microcomputer or a combination of a plurality of circuits or apparatuses. The display control circuit 53 functions as a "display control section, device, or means." Similarly, the display control circuit 53 may be configured as a single circuit or apparatus such as microcomputer or a combination of a plurality of circuits or apparatuses.

According to the above-mentioned embodiments, the manipulation authorization set to the inhibition mode assumes a selected layer to be "none" and thereby prevents the aerial manipulation using finger F from moving the pointer. However, the method of allowing the inhibition mode to prevent a finger manipulation from changing the display mode for an image portion such as the pointer is not limited to the above-mentioned embodiments.

According to a first modification of the above-mentioned embodiments, the manipulation control circuit 33 may function as an "acquisition determination section, device, or means" and may determine whether to allow the display control circuit 53 to acquire a coordinate signal based on a fact that a sensitivity value in the z-axis direction of the input position coordinates changes to cross over first sensitivity threshold value Hth1. In this case, the manipulation control circuit 33 functions as an "acquisition control section, device, or means" and allows the display control circuit 53 to interrupt coordinate signal acquisition until the permission mode permits the coordinate signal acquisition. Based on a fact that the coordinate signal acquisition is permitted, the manipulation control circuit 33 allows the display control circuit 53 to start acquiring a coordinate signal.

According to a second modification of the above-mentioned embodiments, the manipulation control circuit 33 may function as an "output determination section, device, or means" and may determine whether to output a coordinate signal to the display control circuit 53 based on a fact that a sensitivity value in the z-axis direction of the input position coordinates changes to cross over first sensitivity threshold value Hth1. In this case, the manipulation control circuit 33 functions as an "output control section, device, or means" and interrupts coordinate signal output to the display control circuit 53 until the permission mode permits the coordinate signal output. Based on a fact that the coordinate signal output is permitted, the manipulation control circuit 33 starts outputting a coordinate signal to the display control circuit 53.

According to a third modification of the above-mentioned embodiments, the manipulation control circuit 33 may function as an "activation determination section, device, or means" and determine whether to allow the display control circuit 53 to activate the map control based on a fact that a sensitivity value in the z-axis direction of the input position coordinates changes to cross over first sensitivity threshold value Hth1. In this case, the manipulation control circuit 33 functions as an "activation control section, device, or means" and interrupts activation of the map control performed by the display control circuit 53 until the permission mode permits activation of the map control. Based on a fact that the map control activation is permitted, the manipulation control circuit 33 allows the display control circuit 53 to start the map control.

In addition, according to a fourth modification of the above-mentioned embodiments, the manipulation control circuit 33 may function as a "drawing control section, device, or means." The manipulation control circuit 33 may provide control to prevent the display control circuit 53 from drawing an image portion associated with the aerial manipulation when finger F is in the middle of state transition of moving from the aerial manipulation area to the contact manipulation area. This control removes the image portion associated with the aerial manipulation from the display screen 52. The manipulator is free from inadvertently moving the image portion.

The above-mentioned embodiments have described the examples of applying the present disclosure to (i) a remote manipulation apparatus and (ii) a so-called touch-panel manipulation apparatus integrated with a display screen, both of which are used for a vehicle-mounted display system. However, the present disclosure is not limited to vehicles. The manipulation apparatus to which the present disclosure is applied is usable for display systems in general used for various transportation instruments or various information terminals.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A manipulation apparatus, mounted on a vehicle, including a manipulation portion that accepts input using a manipulation entity to manipulate an image portion displayed on a display portion, the manipulation apparatus comprising:
   a detection section that detects a movement manipulation to move the manipulation entity along the manipulation portion;
   an acquisition section that acquires a measurement value increasing and decreasing according to a manipulation entity distance that is defined as a distance between (i) the manipulation portion and (ii) the manipulation entity in space above the manipulation portion;
   an association section that, based on the measurement value acquired by the acquisition section,
      associates the movement manipulation detected by the detection section with a first image control to change a display mode of a first image portion as the image portion in response to the manipulation entity distance being shorter than a predetermined threshold distance and
      associates the movement manipulation detected by the detection section with a second image control to change a display mode of a second image portion as the image portion different from the first image portion in response to the manipulation entity distance exceeding the threshold distance;
   an authorization manipulation determination section that previously stores a specific manipulation performed by the manipulation entity as an authorization manipulation and determines whether the authorization manipulation is performed; and
   a mode changeover section that
      switches between an inhibition mode and a permission mode,
         the inhibition mode inhibiting the associating, by the association section, of the movement manipulation with the second image control,
         the permission mode permitting the associating, by the association section, of the movement manipulation with the second image control, and
      changes the inhibition mode to the permission mode under a condition that the authorization manipulation determination section determines that the authorization manipulation is performed under the inhibition mode, wherein the display portion is provided in an instrument panel of the vehicle to be exposed to be visible from a manipulator manipulating the image portion,
the manipulation portion is positioned to be remotely distanced to be separated from the display portion, the manipulation portion being adjacent to a palm rest of the vehicle, and
the manipulation portion and the display portion are connected using a communication interface.

2. The manipulation apparatus according to claim 1, wherein the detection section also functions as the acquisition section by detecting the movement manipulation and the manipulation entity distance.

3. The manipulation apparatus according to claim 1, wherein the association section elongates the threshold distance under a condition that the movement manipulation is associated with the first image control.

4. The manipulation apparatus according to claim 1, wherein the authorization manipulation determination section stores, as the authorization manipulation, a movement of the manipulation entity to an area closer to the manipulation portion than the threshold distance.

5. The manipulation apparatus according to claim 1, wherein the association section associates a manipulation using the manipulation entity with the second image control when the manipulation entity distance exceeds a first threshold distance as the threshold distance and is shorter than a second threshold distance longer than the first threshold distance; and
wherein the authorization manipulation determination section stores, as the authorization manipulation, a manipulation to continuously position the manipulation entity to an area closer to the manipulation portion than the second threshold distance as long as a predetermined time.

6. The manipulation apparatus according to claim 1, wherein the authorization manipulation determination section stores, as the authorization manipulation, a movement of the manipulation entity along the manipulation portion.

7. The manipulation apparatus according to claim 1, wherein the authorization manipulation determination section stores, as the authorization manipulation, a movement of the manipulation entity along a direction moving away from the manipulation portion.

8. The manipulation apparatus according to claim 1, further comprising:
an inhibition manipulation determination section that previously stores a specific manipulation performed by the manipulation entity as an inhibition manipulation and determines whether the inhibition manipulation is performed to the manipulation portion,
wherein the mode changeover section changes the permission mode to the inhibition mode under a condition that the inhibition manipulation determination section determines that the inhibition manipulation is performed under the permission mode.

9. The manipulation apparatus according to claim 8, wherein the inhibition manipulation determination section stores, as the inhibition manipulation, a movement of the manipulation entity to an area closer to the manipulation portion than the threshold distance.

10. The manipulation apparatus according to claim 1, wherein the association section identifies the first image portion defined as a pointer portion indicating a position on the display portion corresponding to a current manipulation position on the manipulation portion; and wherein the association section identifies the second image portion defined as a non-pointer portion including a selected image portion selected by the pointer portion.

11. The manipulation apparatus according to claim 1, wherein the display portion displays a display image formed by a plurality of drawing layers overlapped with each other including a second image layer to draw the second image portion and a first image layer to draw the first image portion;
wherein a manipulation to manipulate the image portion included in the display image is performed to the manipulation portion;
wherein, when the manipulation entity distance is shorter than the threshold distance, the association section associates the movement manipulation with the first image control by selecting the first image layer as the drawing layer to be manipulated; and
wherein, when the manipulation entity distance exceeds the threshold distance, the association section associates the movement manipulation with the second image control by selecting the second image layer as the drawing layer to be manipulated.

12. The manipulation apparatus according to claim 1, wherein the detection section
complies with a capacitance technique to detect the movement manipulation based on capacitance between the manipulation portion and the manipulation entity and
also functions as the acquisition section by acquiring the manipulation entity distance between the manipulation portion and the manipulation entity based on the capacitance.

13. A manipulation apparatus, mounted on a vehicle, including a manipulation portion that accepts input using a manipulation entity to manipulate an image portion displayed on a display portion, the manipulation apparatus comprising:
a detection section that
detects a movement manipulation to move the manipulation entity along the manipulation portion and
determines whether the movement manipulation corresponds to a contact manipulation or an aerial manipulation,
the contact manipulation causing the manipulation entity to contact the manipulation portion,
the aerial manipulation causing the manipulation entity to be in space above distanced from the manipulation portion;
an association section that associates the contact manipulation and the aerial manipulation detected by the detection section with controls over the image portions different from each other;
a determination section that previously stores a specific manipulation performed by the manipulation entity as an authorization manipulation and determines whether the authorization manipulation is performed; and
a mode changeover section that enables
a permission mode when the determination section determines that the authorization manipulation is performed, the permission mode permitting the associating of the aerial manipulation with the control over the image portion, and
an inhibition mode when the determination section determines that the authorization manipulation is not performed, the inhibition mode inhibiting the associating of the aerial manipulation with the control over the image portion, wherein
the display portion is provided in an instrument panel of the vehicle to be exposed to be visible from a manipulator manipulating the image portion,
the manipulation portion is positioned to be remotely distanced to be separated from the display portion, the manipulation portion being adjacent to a palm rest of the vehicle, and
the manipulation portion and the display portion are connected using a communication interface.

14. A manipulation apparatus, mounted on a vehicle, that causes a display control section controlling display of a display portion to acquire a signal based on input using a manipulation entity to a manipulation portion and enables a manipulation using the manipulation entity to an image portion displayed on the display portion,
the manipulation apparatus comprising:
a detection section that detects a relative position of the manipulation entity in relation to the manipulation portion as an input position coordinate in a three-dimensional direction;
an image portion changeover section that causes the display control section to change the image portion to be controlled based on whether a value indicating a z-axis coordinate exceeds a predetermined threshold value, wherein the z-axis coordinate is included in the input position coordinate detected by the detection section and corresponds to a distance that is defined as a distance between (i) the manipulation portion and (ii) the manipulation entity in space above the manipulation portion;
an acquisition determination section that determines whether the display control section is permitted to acquire the signal indicating the input position coordinate in response to a change crossing over the threshold value resulting from a movement of the manipulation entity,
the change being from a value indicating the z-axis coordinate corresponding to a point before the movement to a value indicating the z-axis coordinate corresponding to a point after the movement; and
an acquisition control section that
causes the display control section to interrupt acquiring the signal until a permission determination is performed by the acquisition determination section, the permission determination permitting the display control section to acquire the signal and
permits the display control section to start acquiring the signal based on the permission determination having been performed, wherein
the display portion is provided in an instrument panel of the vehicle to be exposed to be visible from a manipulator manipulating the image portion,
the manipulation portion is positioned to be remotely distanced to be separated from the display portion, the manipulation portion being adjacent to a palm rest of the vehicle, and
the manipulation portion and the display portion are connected using a communication interface.

15. A manipulation apparatus, mounted on a vehicle, that causes a display control section controlling display of a display portion to acquire a signal based on input using a manipulation entity to a manipulation portion and enables a manipulation using the manipulation entity to an image portion displayed on the display portion,
the manipulation apparatus comprising:

a detection section that detects a relative position of the manipulation entity in relation to the manipulation portion as an input position coordinate in a three-dimensional direction;

an image portion changeover section that causes the display control section to change the image portion to be controlled based on whether a value indicating a z-axis coordinate exceeds a predetermined threshold value, wherein the z-axis coordinate is included in the input position coordinate detected by the detection section and corresponds to a distance that is defined as a distance between (i) the manipulation portion and (ii) the manipulation entity in space above the manipulation portion;

an output determination section that determines whether to output the signal indicating the input position coordinate to the display control section in response to a change crossing over the threshold value resulting from a movement of the manipulation entity, the change being from a value indicating the z-axis coordinate corresponding to a point before the movement to a value indicating the z-axis coordinate corresponding to a point after the movement; and an output control section that interrupts outputting the signal to the display control section until a permission determination is performed by the output determination section, the permission determination permitting outputting the signal to the display control section and permits starting of outputting the signal to the display control section based on the permission determination having been performed, wherein the display portion is provided in an instrument panel of the vehicle to be exposed to be visible from a manipulator manipulating the image portion, the manipulation portion is positioned to be remotely distanced to be separated from the display portion, the manipulation portion being adjacent to a palm rest of the vehicle, and the manipulation portion and the display portion are connected using a communication interface.

16. A manipulation apparatus, mounted on a vehicle, that causes a display control section controlling display of a display portion to acquire a signal based on input using a manipulation entity to a manipulation portion and enables a manipulation using the manipulation entity to an image portion displayed on the display portion, the manipulation apparatus comprising:

a detection section that detects a relative position of the manipulation entity in relation to the manipulation portion as an input position coordinate in a three-dimensional direction;

an image portion changeover section that causes the display control section to change the image portion to be controlled based on whether a value indicating a z-axis coordinate exceeds a predetermined threshold value, wherein the z-axis coordinate is included in the input position coordinate detected by the detection section and corresponds to a distance that is defined as a distance between (i) the manipulation portion and (ii) the manipulation entity in space above the manipulation portion;

an activation determination section that determines whether the display control section is permitted to activate a control of the image portion based on the input position coordinate in response to a change crossing over the threshold value resulting from a movement of the manipulation entity, the change being from a value indicating the z-axis coordinate corresponding to a point before the movement to a value indicating the z-axis coordinate corresponding to a point after the movement; and an activation control section that causes the display control section to interrupt activating the control of the image portion until a permission determination is performed by the acquisition determination section, the permission determination permitting the display control section to acquire the signal and permits the display control section to start activating the control of the image portion based on the permission determination having been performed, wherein the display portion is provided in an instrument panel of the vehicle to be exposed to be visible from a manipulator manipulating the image portion, the manipulation portion is positioned to be remotely distanced to be separated from the display portion, the manipulation portion being adjacent to a palm rest of the vehicle, and the manipulation portion and the display portion are connected using a communication interface.

17. A manipulation apparatus, mounted on a vehicle, that is connected to a display control section to draw a display image transmitted to a display portion and is capable of manipulating an image portion included in the display image in response to input to a manipulation portion using a manipulation entity, the manipulation apparatus comprising:

a detection section that detects (i) a contacting state of the manipulation entity to be on the manipulation portion and (ii) an approaching state of the manipulation entity to be above the manipulation portion, in relation to the manipulation portion;

a transmission control section that causes the display control section to transmit the display image including a first image portion corresponding to the contacting state to the display portion according to the detection section detecting the contacting state and causes the display control section to transmit the display image including a second image portion corresponding to the approaching state to the display portion according to the detection section detecting the approaching state; and a drawing control section that inhibits the display control section from drawing the second image portion into the display image when the manipulation entity detected by the detection section is under a state transition changing from the approaching state to the contacting state, wherein the display portion is provided in an instrument panel of the vehicle to be exposed to be visible from a manipulator manipulating the image portion, the manipulation portion is positioned to be remotely distanced to be separated from the display portion, the manipulation portion being adjacent to a palm rest of the vehicle, and the manipulation portion and the display portion are connected using a communication interface.

18. The manipulation apparatus according to claim 17, wherein the detection section is capable of detecting an input position coordinate in a three-dimensional direction over a surface of the manipulation portion;

wherein the approaching state and the contacting state each correspond to a z-axis coordinate of the input position coordinate detected by the detection section.

19. The manipulation apparatus according to claim 18, wherein the drawing control section causes the display control section to start drawing the first image portion into the display image in the contacting state based on detection of at least one of an x-axis coordinate and a y-axis coordinate on the surface of the manipulation portion.

20. The manipulation apparatus according to claim 13, wherein the detection section is a capacitance-type touch sensor.

21. A manipulation apparatus, mounted on a vehicle, that is manipulated by a manipulation entity and varies display modes of a plurality of image portions displayed on a display portion, the manipulation apparatus comprising:
    a manipulation surface that receives input using the manipulation entity; and
    a control circuit that
        detects a movement of the manipulation entity approaching the manipulation surface,
        acquires a distance measurement value varying with a distance that is defined as a distance being between (i) the manipulation surface and (ii) the manipulation entity in space above the manipulation surface,
        changes a display mode of a first image portion out of the image portions based on the movement of the manipulation entity when the distance between the manipulation surface and the manipulation entity is shorter than a threshold distance, and
        changes a display mode of a second image portion different from the first image portion out of the image portions when the distance between the manipulation surface and the manipulation entity is longer than or equal to the threshold distance,
    wherein the control circuit
        enables an inhibition mode to inhibit an input using the manipulation entity from changing the display mode of the second image portion,
        determines whether a manipulation using the manipulation entity complies with a specified authorization manipulation, and
        disables the inhibition mode when the authorization manipulation is performed, wherein
    the display portion is provided in an instrument panel of the vehicle to be exposed to be visible from a manipulator manipulating the image portion,
    the manipulation surface is positioned to be remotely distanced to be separated from the display portion, the manipulation surface being adjacent to a palm rest of the vehicle, and
    the manipulation surface and the display portion are connected using a communication interface.

22. A manipulation apparatus, mounted on a vehicle, that is manipulated by a manipulation entity and varies display modes of a plurality of image portions displayed on a display portion, the manipulation apparatus comprising:
    a manipulation surface that receives input using the manipulation entity; and
    a control circuit that
        detects a movement of the manipulation entity approaching the manipulation surface,
        acquires a distance measurement value varying with a distance that is defined as a distance being between (i) the manipulation surface and (ii) the manipulation entity in space above the manipulation surface,
        determines whether the distance between the manipulation surface and the manipulation entity is shorter than a threshold distance,
        enables an inhibition mode to inhibit an input using the manipulation entity from being reflected on a display mode of the image portion when the distance between the manipulation surface and the manipulation entity is not shorter than the threshold distance,
        determines whether a manipulation using the manipulation entity complies with a specified authorization manipulation, and
        enables a permission mode to permit the manipulation using the manipulation entity from being reflected on the display mode of the image portion even in case that the distance between the manipulation surface and the manipulation entity is not shorter than the threshold distance, when the authorization manipulation is performed, wherein
    the display portion is provided in an instrument panel of the vehicle to be exposed to be visible from a manipulator manipulating the image portion,
    the manipulation surface is positioned to be remotely distanced to be separated from the display portion, the manipulation surface being adjacent to a palm rest of the vehicle, and
    the manipulation surface and the display portion are connected using a communication interface.

23. A manipulation apparatus, mounted on a vehicle, that is manipulated by a manipulation entity and varies display modes of a plurality of image portions displayed on a display portion, the manipulation apparatus comprising:
    a manipulation surface that receives input using the manipulation entity; and
    a control circuit that
        detects a movement of the manipulation entity approaching the manipulation surface,
        acquires a distance measurement value varying with a distance that is defined as a distance between (i) the manipulation surface and (ii) the manipulation entity in space above the manipulation surface, and
        performs a mode changeover that changes from a first mode to a second mode based on a manipulation using the manipulation entity,
            the first mode not varying the display modes of the image portions depending on whether or not the distance between the manipulation surface and the manipulation entity is longer than a predetermined distance,
            the second mode varying the display modes of the image portions depending on whether or not the distance between the manipulation surface and the manipulation entity is longer than the predetermined distance, wherein
    the display portion is provided in an instrument panel of the vehicle to be exposed to be visible from a manipulator manipulating the image portion,
    the manipulation surface is positioned to be remotely distanced to be separated from the display portion, the manipulation surface being adjacent to a palm rest of the vehicle, and
    the manipulation surface and the display portion are connected using a communication interface.

24. A manipulation apparatus, mounted on a vehicle, including a manipulation portion that accepts input using a manipulation entity to manipulate an image portion displayed on a display portion, the manipulation apparatus comprising:
  a detection section that detects a movement manipulation to move the manipulation entity along the manipulation portion;
  an acquisition section that acquires a measurement value increasing and decreasing according to a manipulation entity distance that is defined as a distance between (i) the manipulation portion and (ii) the manipulation entity in space above the manipulation portion;
  an association section that, based on the measurement value acquired by the acquisition section,
    associates the movement manipulation detected by the detection section with a first image control to change a display mode of a first image portion as the image portion in response to the manipulation entity distance being shorter than a predetermined threshold distance and
    associates the movement manipulation detected by the detection section with a second image control to change a display mode of a second image portion as the image portion different from the first image portion in response to the manipulation entity distance exceeding the threshold distance;
  an authorization manipulation determination section that previously stores a specific manipulation performed by the manipulation entity as an authorization manipulation and determines whether the authorization manipulation is performed;
  a mode changeover section that
    switches between an inhibition mode and a permission mode,
      the inhibition mode inhibiting the associating, by the association section, of the movement manipulation with the second image control,
      the permission mode permitting the associating, by the association section, of the movement manipulation with the second image control, and
    changes the inhibition mode to the permission mode under a condition that the authorization manipulation determination section determines that the authorization manipulation is performed under the inhibition mode; and
  a traveling state determination section that determines whether the vehicle is traveling, wherein
  the association section shortens the threshold distance when the traveling state determination section determines that the vehicle is traveling.

25. A manipulation apparatus, mounted on a vehicle, including a manipulation portion that accepts input using a manipulation entity to manipulate an image portion displayed on a display portion, the manipulation apparatus comprising:
  a detection section that detects a movement manipulation to move the manipulation entity along the manipulation portion;
  an acquisition section that acquires a measurement value increasing and decreasing according to a manipulation entity distance that is defined as a distance between (i) the manipulation portion and (ii) the manipulation entity in space above the manipulation portion;
  an association section that, based on the measurement value acquired by the acquisition section,
    associates the movement manipulation detected by the detection section with a first image control to change a display mode of a first image portion as the image portion in response to the manipulation entity distance being shorter than a predetermined threshold distance and
    associates the movement manipulation detected by the detection section with a second image control to change a display mode of a second image portion as the image portion different from the first image portion in response to the manipulation entity distance exceeding the threshold distance;
  an authorization manipulation determination section that previously stores a specific manipulation performed by the manipulation entity as an authorization manipulation and determines whether the authorization manipulation is performed;
  a mode changeover section that
    switches between an inhibition mode and a permission mode,
      the inhibition mode inhibiting the associating, by the association section, of the movement manipulation with the second image control,
      the permission mode permitting the associating, by the association section, of the movement manipulation with the second image control, and
    changes the inhibition mode to the permission mode under a condition that the authorization manipulation determination section determines that the authorization manipulation is performed under the inhibition mode; and
  a traveling state determination section that determines whether the vehicle is traveling, wherein
  the association section associates a manipulation using the manipulation entity with the second image control when the manipulation entity distance exceeds a first threshold distance as the threshold distance and is shorter than a second threshold distance longer than the first threshold distance, and
  the association section elongates the second threshold distance when the traveling state determination section determines that the vehicle is traveling.

* * * * *